(12) United States Patent
Garcia-Luna-Aceves et al.

(10) Patent No.: US 11,765,078 B2
(45) Date of Patent: Sep. 19, 2023

(54) TECHNIQUES FOR LOOP-FREE DYNAMIC ON-DEMAND AND PROACTIVE ROUTING IN COMMUNICATIONS NETWORKS

(71) Applicant: The Regents of the University of California, Oakland, CA (US)

(72) Inventors: Jose Joaquin Garcia-Luna-Aceves, Santa Cruz, CA (US); Ehsan Hemmati, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/879,475

(22) Filed: May 20, 2020

(65) Prior Publication Data

US 2020/0374224 A1 Nov. 26, 2020

Related U.S. Application Data

(60) Provisional application No. 62/850,150, filed on May 20, 2019.

(51) Int. Cl.
*G06F 15/16* (2006.01)
*H04L 45/00* (2022.01)
(Continued)

(52) U.S. Cl.
CPC ............. *H04L 45/54* (2013.01); *H04L 45/021* (2013.01); *H04L 45/122* (2013.01); *H04L 45/18* (2013.01);
(Continued)

(58) Field of Classification Search
CPC ....... H04L 45/122; H04L 45/18; H04L 45/42; H04L 45/74; H04L 45/021; H04L 45/54; H04W 40/242; H04W 84/18
See application file for complete search history.

(56) References Cited

U.S. PATENT DOCUMENTS 9,374,294 B1 * 6/2016 Pani ................... H04L 41/5054
2005/0041591 A1 * 2/2005 Duggi .................. H04W 40/02
370/238

(Continued)

OTHER PUBLICATIONS

Haas, "The Zone Routing Protocol (ZRP) for Ad Hoc Networks", 1997 (Year: 1997).*

(Continued)

*Primary Examiner* — Oscar A Louie
*Assistant Examiner* — Messeret F Gebre
(74) *Attorney, Agent, or Firm* — Wolter Van Dyke Davis, PLLC; Eugene J. Molinelli

(57) ABSTRACT

Techniques for routing in communications networks include determining a state of a destination node in a current routing table stored at a first node. A value for a reference cost to the destination node is determined based on a minimum cost to the destination in the current routing table. Based on the state, a request message is formed including a reference distance field to prevent loops, an originating node field, a destination field, and a previous hop field. The request message is sent to a different second node within range. A record that indicates the data in the request message is stored in a pending request table. A reply message is received in response to sending the request message. In response to receiving the reply message, the record in the pending request table is removed, and the current routing table is updated based on the reply message.

15 Claims, 15 Drawing Sheets

(51) Int. Cl.
 H04L 45/42 (2022.01)
 H04L 45/18 (2022.01)
 H04L 45/74 (2022.01)
 H04L 45/122 (2022.01)
 H04W 84/18 (2009.01)
 H04L 45/021 (2022.01)
 H04W 40/24 (2009.01)
 H04L 12/54 (2022.01)

(52) U.S. Cl.
 CPC .............. *H04L 45/42* (2013.01); *H04L 45/74* (2013.01); *H04W 40/242* (2013.01); *H04W 84/18* (2013.01); *H04L 12/56* (2013.01)

(56) References Cited

U.S. PATENT DOCUMENTS

| | | | | |
|---|---|---|---|---|
| 2006/0291496 | A1* | 12/2006 | Zheng | H04L 45/46 370/335 |
| 2008/0101244 | A1* | 5/2008 | Liu | H04W 40/34 370/238 |
| 2011/0176416 | A1* | 7/2011 | Bhatti | H04L 45/24 370/328 |
| 2015/0055506 | A1* | 2/2015 | Birlik | H04W 16/10 370/254 |
| 2017/0078191 | A1* | 3/2017 | Choi | H04L 45/54 |
| 2018/0176119 | A1* | 6/2018 | Abdallah | H04B 7/0413 |

OTHER PUBLICATIONS

Eslamnour, "A Hybrid Multi-Channel Multi-Interface Routing Protocol for Wireless Ad-Hoc Networks", 2009.*
Rangarajan, "Achieving Loop-Free Incremental Routing in Ad Hoc Network", 2004 (Year: 2004).*
Naidu, "Energy Aware Node Disjoint Multipath Routing in Mobile Ad Hoc Network", 2009 (Year: 2009).*
D. Kato, "Latency model of a distributed hash table with big routing table," Proceedings. Fourth International Conference on Peer-to-Peer Computing, 2004. Proceedings., Zurich, Switzerland, 2004 (Year: 2004).*
Li, Y., Zhang, D., Huang, K., He, D., & Long, W. (2014). A memory-efficient parallel routing lookup model with fast updates. Computer Communications, 38, 60-71 (Year: 2014).*
S. Novoselov, "Wireless Sensor Network for Communication Between Base Stations in the Local Positioning System," 2018 International Scientific—Practical Conference Problems of Infocommunications. Science and Technology (PIC S&T), Kharkiv, Ukraine, 2018, pp. 383-386 (Year: 2018).*
Abolhasan et al., A Review of Routing Protocols for Mobile Ad Hoc Networks, Ad Hoc Networks 2, 2004, pp. 1-22.
Bhargavan et al., Formal Verification of Standards for Distance Vector Routing Protocols, Journal of the ACM, 2002, pp. 538-576, vol. 49, No. 4.
Behrens and Garcia-Luna-Acevas, Hierarchical Routing Using Link Vectors, Proc. IEEE INFOCOM, 1998, pp. 702-710.
Boukersche, Handbook of Algorithms for Wireless Networking and Mobile Computing, Chapman and Hall, 2006, pp. 1-983.
Jacquet et la., Optimized Link State Routing Protocol (OLSR) for Ad Hoc Networks, RFC 3626, 2003, pp. 1-8.
Corson and Ephremides, A Distributed Routing Algorithm for Mobile Wireless Networks, Wireless Networks, 1995, pp. 61-81.
Clausen, Comparative Study of Routing Protocols for Mobile Ad-hoc networks, Research Report RR-5135, INRIA, 2004, pp. 1-29.
Garcia-Luna-Aceves and Rangarajan, A New Framework for Loop-Free On-Demand Routing Using Destination Sequence Numbers, Proc. IEEE MASS, 2004, pp. 426-435.
Garcia-Luna-Aceves and Spohn, Source-Tree Routing in Wireless Networks, Proc. of IEEE ICNP, 1999, pp. 1-10.
Garcia-Luna-Aceves and Roy, On-Demand Loop-free Routing with Link Vectors, IEEE JSAC, 2005, pp. 533-546, vol. 23, No. 3.
Haas and Pearlman, Providing Ad-hoc Connectivity with the Reconfigurable Wireless Networks, Proc. IEEE ICUPC, 1997, pp. 1-28.
Joa-Ng and Lu, A Peer-to-peer Zone-based Two-level Link State Routing for Mobile Ad Hoc Networks, IEEE JSAC, 1999, pp. 1415-1425, vol. 17, No. 8.
Johnson and Maltz, Dynamic Source Routing in Ad Hoc Wireless Networks, Mobile Computing, Chapter 5, Kluwer Academic Publishers, 1996, pp. 1-18.
Jubin and Tornow, The DARPA Packet Radio Network Protocols, Proc. of the IEEE, 1987, pp. 21-33, vol. 75, No. 1.
Kahn, The Organization of Computer Resources into a Packet Radio Network, IEEE Trans. Commun., 1977, pp. 169-178, vol. COM-25, No. 1.
Ko and Vaidya, Location-Aided Routing (LAR) in Mobile Ad Hoc Networks, Wireless Networks, 2000, pp. 66-75, vol. 6, No. 4.
Marina and Das, Ad Hoc On-Demand Multipath Distance vector Routing, Wireless Commun. Mob. Comput., 2006, pp. 969-988, vol. 6.
Lee et al., Hybrid Gateway Advertisement Scheme for Connecting Mobile Ad Hoc Networks to the Internet, Proc. IEEE VTC, 2003, pp. 191-195.
Liang and Haas, Hybrid Routing in Ad Hoc Networks with a Dynamic Virtual Backbone, IEEE Trans. Wireless Comm., 2006, pp. 1392-1405, vol. 5, No. 6.
Murthy and Carcia-Luna-Aceves, An Efficient Routing Protocol for Wireless Networks, Mobile Networks and Applications, 1996, pp. 183-197.
Navid et al., HARP: Hybrid Ad hoc Routing Protocol, Proc. Int'l Symp. on Telecommunications, 2001, pp. 1-7.
Perkins and Bhagwat, Routing over Multi-hop Wireless Network of Mobile Computers, Proc. ACM SIGCOMM, 1994, 2 pages.
Perkins and Royer, Ad-Hoc On-Demand Distance Vector Routing, Proc. IEEE WMCSA,, 1999, pp. 1-11.
Raju and Garcia-Luna-Aceves, A New Approach to On-Demand Loop-Free Multipath Routing, Proc. IEEE ICCCN, 1999, pp. 522-527.
Ramasubramanian et al., SHARP: A Hybrid Adaptive Routing Protocol for Mobile Ad Hoc Networks, Proc. ACM MobiHoc, 2003, pp. 1-12.
Roy and Garcia-Luna-Aceves, Node-Centric Hybrid Routing for Ad Hoc Networks, Proc. 10th IEEE/ACM Mascots, 2002, pp. 1-9.
Van Glabbeek et al., Sequence Numbers do not Guarantee Loop Freedom—AODV Can Yield Routing Loops, Proc. ACM MSWiM, 2013, pp. 1-10.
Wu and Li, On Calculating Connected Dominating Set for Efficient Routing in Ad Hoc Wireless Networks, Proc. ACM DIALM, 1999, pp. 7-14.
Xu et al., A Unified Analysis of Routing Protocols in MANETs, IEEE Trans. on Communications, 2010, pp. 1-12.
Zhou et al., The Proof of AODV Loop Freedom, Proc. IEEE WCS, 2009, pp. 1-5.

* cited by examiner

TECHNIQUES FOR LOOP-FREE DYNAMIC ON-DEMAND AND PROACTIVE ROUTING IN COMMUNICATIONS NETWORKS

CROSS-REFERENCE TO RELATED APPLICATIONS

This application claims benefit, under 35 U.S.C. § 119(e), of Provisional Appln. 62/850,150, filed May 20, 2019, the entire contents of which are hereby incorporated by reference as if fully set forth herein.

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically effected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

The internetwork header provides information defining the source and destination address within the network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header.

Some network layer addresses, including IP addresses, are hierarchical and can be aggregated. Hierarchical addresses are organized into numerous groups and subgroups and subgroups of subgroups, etc. Each layer of subgroups successively narrow the address space until at, the finest level of granularity of the address space, a single element of the network is indicated (e.g., a network interface card on a network node). A group address aggregates the addresses in the subgroups of that group.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately, and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

A link-state protocol is an example of a routing protocol, which only exchanges control plane messages used for routing data packets sent in a different routed protocol (e.g., IP). In a link-state protocol, two routers establish an adjacency relationship between them by first verifying direct two-way communication between them over the same network segment and then synchronizing their link-state databases. Link-state data describe all links to a router and describes the network addresses reachable on each of those links, as well as other properties of the link. Once the adjacency relationship is established, the two routers are called peers.

A routing table stored at each router holds data that indicates, for each adjacent node, a list of destinations reached by that node and a cost of using that node to get to that destination. Cost can be determined in any way, from number of hops to the destination, to congestion on any or all hops to the destination, to any other factor known in the art. A valid successor is the neighbor on a route from the current node that reaches the destination at the lowest cost (including the cost from the current node to that neighbor).

With modern mobile wireless devices, network nodes come and go, and thus establish communication links when in range and lose communication links when out of range. Mobile Ad hoc NETwork (MANET) is made up from a set of MANET routers (MRs). These MRs organize and maintain a routing structure among themselves over such dynamic wireless interfaces. Various protocols have been established to form and update the routing tables in such ad hoc networks. One important aspect of the way in which such protocols operate is whether they are proactive or reactive (that is, react to a packet identifying a particular destination, also called on-demand, hereinafter). A proactive routing protocol maintains routing state for destinations independently of whether there is actual data traffic intended for the destinations. An on-demand routing protocol establishes routing state in response to receiving data traffic intended for the destination. Proactive routing protocols result in shorter delays finding viable routes to destinations, but incur signaling overhead for all destinations and hence scale poorly with increasing numbers of participating nodes. In contrast, on-demand routing protocols incur signaling overhead only for destinations for which there is actual traffic, but suffer from increased latencies in finding viable routes.

SUMMARY

Techniques are provided for establishing routes in an communications network using signaling that supports both proactive and on-demand routing.

In a first set of embodiments, a method is implemented on a processor of a node in an communications network to build a routing table. The method includes determining a state of a destination node in a current routing table stored at a first node in an ad hoc communications network. An entry in the current routing table expires after a maximum lifetime from a last update of the entry. When the state of the destination node satisfies a request condition, the method then includes the following steps. The method includes determining a value for a reference cost to the destination node based on a minimum cost to the destination in the current routing table. The method also includes forming a first request message that includes a reference distance field holding data that indicates the reference cost, an originating node field that holds data that indicates the first node initiates the request message, a destination field that holds data that indicates the destination node, and a previous hop field holding data that indicates a neighboring node from which the request is received, wherein the previous hop field holds a null value. Still further, the method includes sending the first request message to a different second node in the communications network within range. The method yet further includes storing in a pending request table a first record holding data that indicates the data in the request message. Even further, the method includes receiving a first reply message in response to sending the first request message. Even further still, the method includes, in response to receiving the first reply message, removing the first record in the pending request table, and updating the current routing table based on the reply message.

In some embodiments of the first set, the method also includes receiving a different second request message from a third node in the communications network within range. The third node is different from the first node and the second request message includes a sender distance field that holds data that indicates a cost to the third node from a fourth node indicated in the originating node field of the second request message. When data in the destination field of the second request message indicates the first node, then the method further includes determining a destination cost by adding the cost to the third node from the fourth node to a cost from the third node to the first node. The method still further includes forming a different second reply message that includes a destination distance field holding data that indicates the destination cost, and sending the second reply message to the third node.

In some of these embodiments, the method further includes, when data in the destination field of the second request message indicates a second destination different from the first node and data in the reference distance field of the second request message indicates a cost greater than a cost in the current routing table to the second destination, then determining a destination cost by adding the cost to the third node from the fourth node and the cost from the third node to the first node and the cost in the current routing table to the second destination. The method includes forming the second reply message that includes the destination distance field holding data that indicates the destination cost using one or more fields in the second reply message; and, sending the second reply message to the third node.

In some of these embodiments, the method further includes, when data in the reference distance field of the second request message indicates a non-zero cost less than a cost in the current routing table to a second destination indicated by data in the destination field of the second request message, then forwarding the second request message; and storing in the pending request table a second record holding data that indicates the data in the second request message.

In some of these embodiments of the first set, the method further includes becoming a proactive destination by forming a different second reply message that includes a reference distance field holding data that indicates a null value. This method also includes sending the second reply message at intermittent times to every node in the communications network within range.

In other sets of embodiments, a computer-readable medium or a system is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which.

DETAILED DESCRIPTION

Techniques are described for determining one or more loop free routes for communications networks, either proactively or on demand. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus a value 1.1 implies a value from 1.05 to 1.15. The term "about" is used to indicate a broader range centered on the given value, and unless otherwise clear from the context implies a broader rang around the least significant digit, such as "about 1.1" implies a range from 1.0 to 1.2. If the least significant digit is unclear, then the term "about" implies a factor of two, e.g., "about X" implies a value in the range from 0.5X to 2X, for example, about 100 implies a value in a range from 50 to 200. Moreover, all ranges disclosed herein are to be understood to encompass any and all sub-ranges subsumed therein. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of distance as a cost function in an ad hoc communications network. However, the invention is not limited to this context. In other embodiments any cost function known in the art can be used in place of "distance," or the protocol is used in other types of fixed or ad hoc local and wide area networks, or some combination.

1. OVERVIEW

Figure 1:
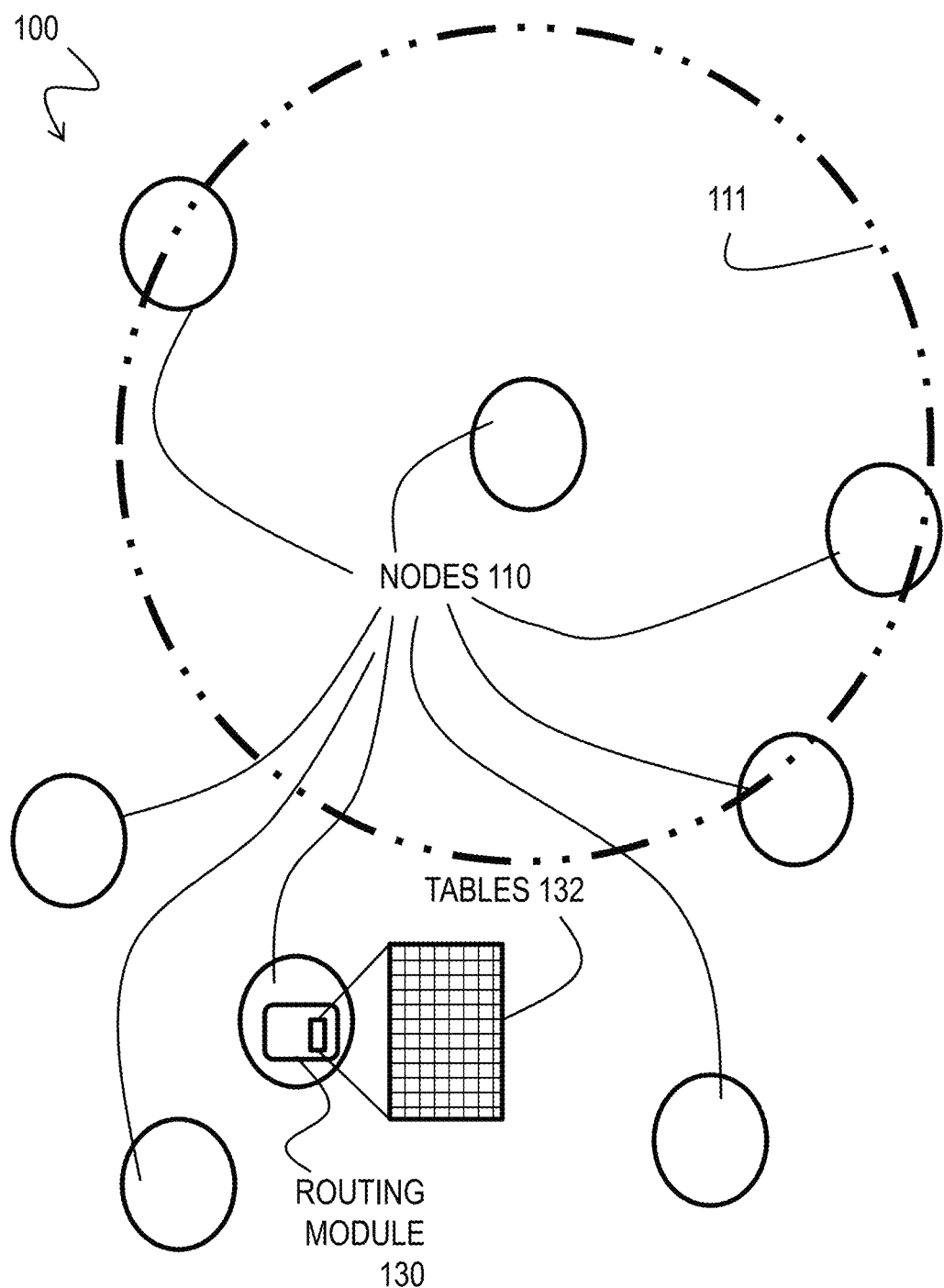
FIG. 1 is a block diagram that illustrates an example mobile ad hoc communications network, according to an embodiment.

FIG. 1 is a block diagram that illustrates an example mobile ad hoc communications network 100, according to an embodiment. Mobile nodes 110 represented as circles are assembled in space and move in and out of communication range of each other. Communication range 111 is represented as a double dot dash circle centered around one of the nodes 110. Each node 110 stores data in one or more tables 132 (represented by gridded pattern-filled rectangle) that indicate the adjacent nodes in direct in-range communication, the cost to send packets to each adjacent node, and the cost of traversing to one or more nodes out of direct communication via one or more of the adjacent nodes. As indicated above, cost can indicate any measure of resistance to communication, such as number of hops, percentage of unavailable bandwidth, latency times, etc. In the following, the term "distance" is used interchangeably with the term "cost."

Each node includes a routing module 130 is a processor implemented method (hardware, firmware or software) and stored data configured to cause the node to operate as described herein.

According to various embodiments, as described in more detail in the Examples Section for an example embodiment, the stored data for the routing module includes four tables stored at each node. These tables help to determine available routes and costs and the status of updates. A Link-Cost Table stores the cost of each link from node i to each known neighbor k. A Distance Table specifies the identifier of destination d and the distance (i.e., cost) to d reported by each known neighbor. A Routing Table specifies the identifier of d, the shortest distance to d, the set of valid successors (neighbors that achieve the shortest distance), a proactive update timeout, and a lifetime for the routing-table entry. In an advance over previous link state protocols, each node also stores a Pending-Request Table that keeps track of the route request messages waiting for replies. The Pending-Request Table specifies an identifier of node d, the smallest reference distance received in a pending request from a neighbor, a request list, and a lifetime for the entry. The list includes one or more records (also called tuples in the Examples Section), with each record including fields holding data that indicates the identifier of the origin of a route request, and identifier-distance pairs for all neighbors (called pending-request neighbors) from which the request was received. Each node also includes data that indicates a modality for the node as a destination, indicating either on-demand or proactive. The above tables and signaling described below support both modalities.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

2. STRUCTURES

Figure 2:
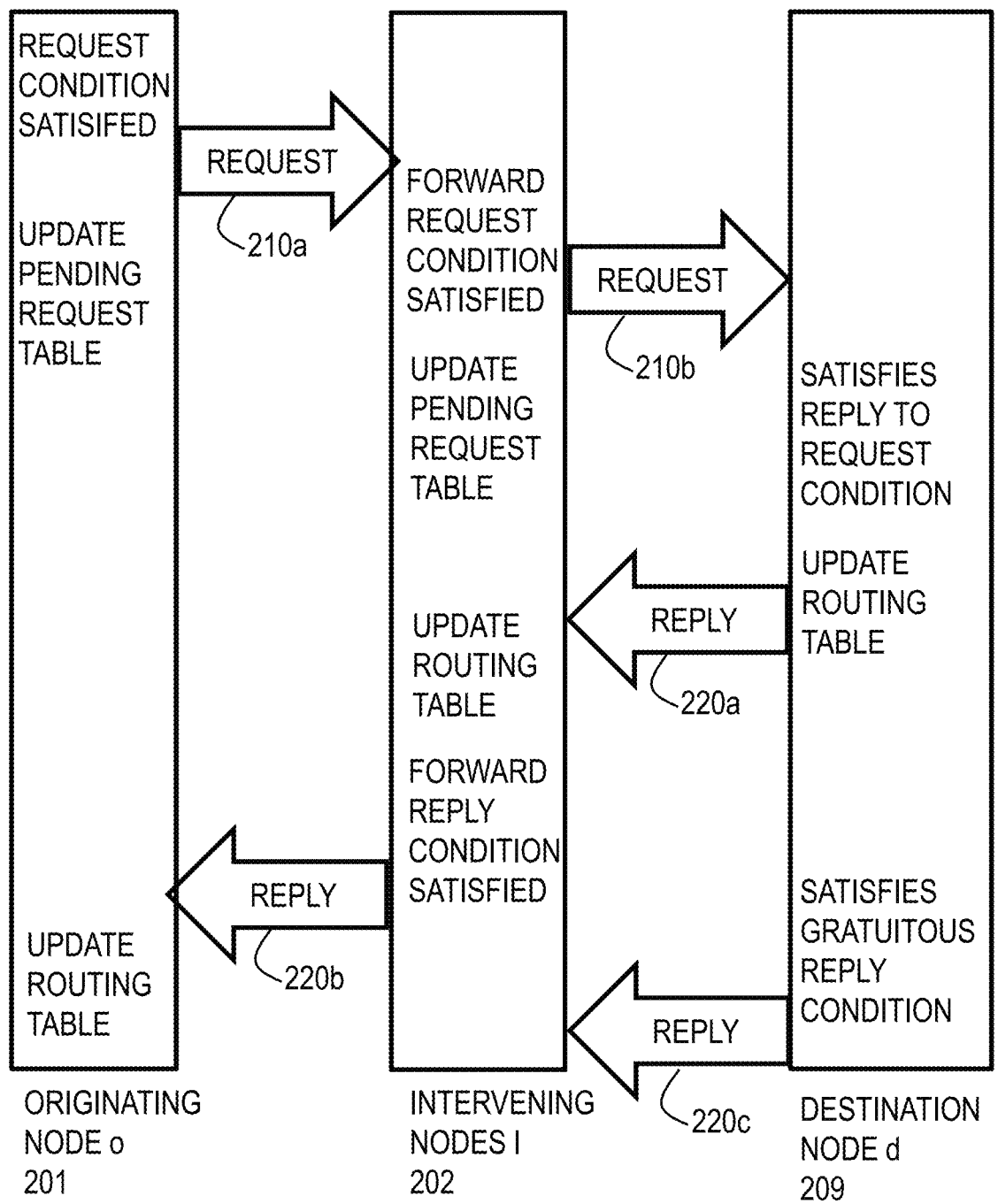
FIG. 2 is a block diagram that illustrates example request and reply signaling messages transmitted between example nodes in an ad hoc communications network, according to an embodiment.

FIG. 2 is a block diagram that illustrates example request and reply signaling messages transmitted between example nodes in an ad hoc communications network, according to an embodiment. Two types of routing signaling messages are utilized: the first type, called a request message; and the second type, called a reply message. In some embodiments, the two types of messages have the same set of fields and formatting, with one field indicating the message is a request message by a first value (e.g., 0) and a reply message by a second value (e.g., 1). Some fields hold null data values until that field has some use during the signaling. The use of signaling is illustrated in FIG. 2, by three representative nodes, a request originating node o 201, a destination node d 209, and zero or more intervening nodes 1202. Time advances from top to bottom in this diagram.

Figure 3A:
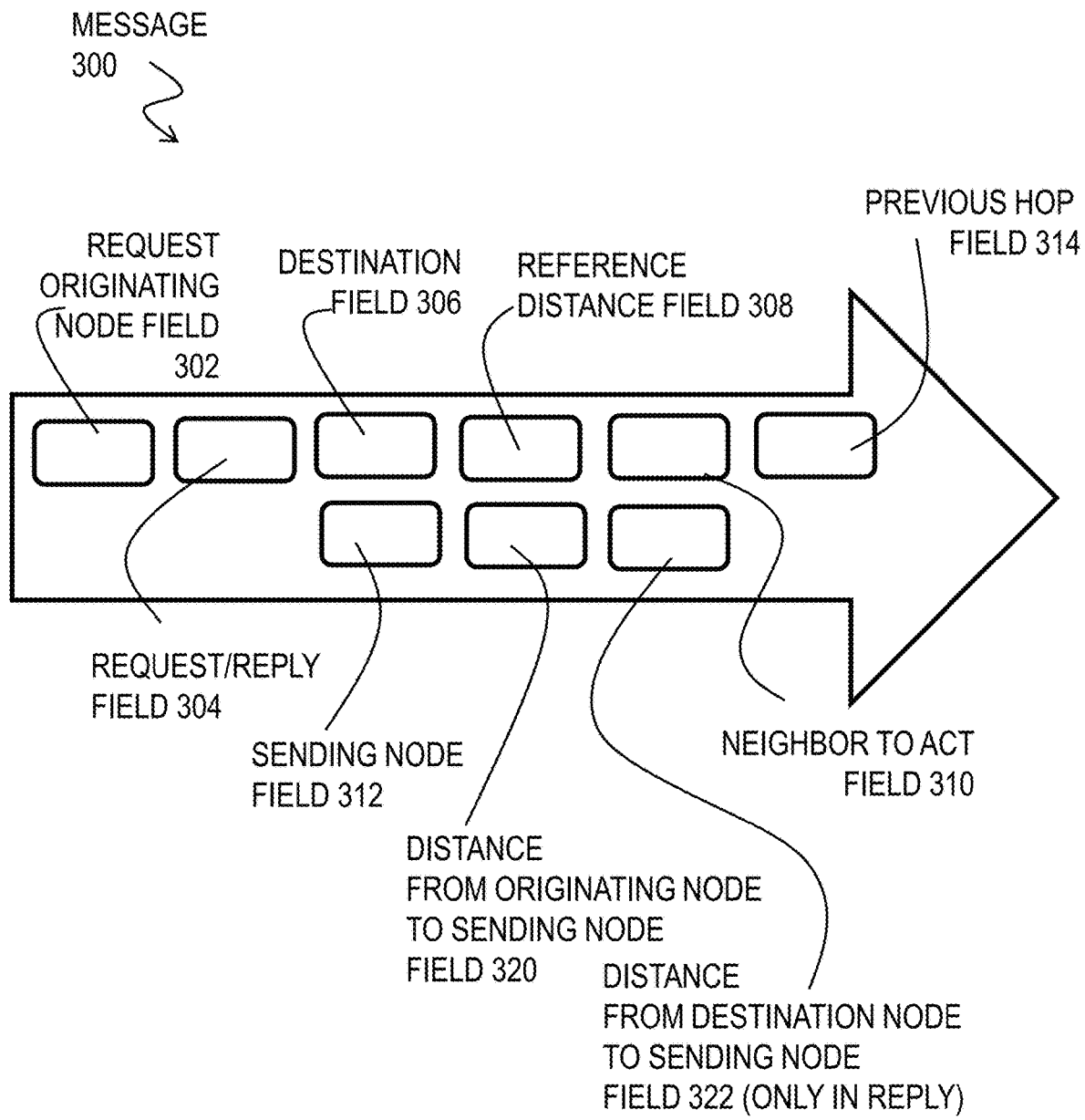
FIG. 3A is a block diagram that illustrates an example signaling message, according to an embodiment.

At an earliest depicted time, when conditions for originating a request message occur, the originating node o 201 sends a request message 210a to its neighbors (i.e., members of the ad hoc network within wireless communications range). The Examples Section lists one or more conditions for originating a request. An example condition occurs when an entry in a routing table for a destination d 209 expires due to the passing of the maximum lifetime after that entry was last updated. Information in the request message 210*a* is sufficient for intervening node i 202 and destination node d 209 to properly forward or reply to the request, as explained in greater detail in the Examples Section. Example fields in a message are depicted in FIG. 3A. In some embodiments, a request message is generated that asks for only the destination node d 209 to reply (rather than accept a reply from any intervening nodes i 202). This condition is called a "reset" and is indicated by setting a reference distance to zero in the request message.

When a request is received at an intervening node i 202, it is determined whether to forward, ignore, remember or reply to the request. The conditions for each action are described for an embodiment in the Examples Section. For purposes of illustration, it is assumed that conditions are satisfied to forward the request at intervening node i 202. If so, then the intervening node 202 adds information about its hop and forwards the request as request message 210*b*, eventually arriving at destination node d 209 (or an intervening node that can reply, not shown). In some conditions, the request is directed to a single neighbor of the intervening node i 202 and that neighbor is indicated in the message. The intervening node i 202 also adds a record based on the request message to update its own Pending-Request Table. If the intervening node 202 has a valid successor to the destination node d 209, then in some embodiments, the intervening node 202 can reply; and the request need not be forwarded to the destination node d 209. However, when an intervening node 202 with a valid routing-table entry for destination d 209 receives a "reset request" (a request with a zero value for a reference distance), the intervening node 202 forwards the request directly to the neighbor, other than node k that sent the request, which has the smallest identifier among the nodes in its valid successor set. This forces the destination node 209 to reply rather than allowing an intervening node 202 to reply. Request messages, e.g., messages 210*a*, and 210*b* among others, are collectively referenced hereinafter as request messages 210.

At destination node d 209 (or replying intervening node, not shown) it is determined whether conditions are satisfied to reply to the request. If so, the routing table at the destination node 209 is updated with the new information garnered by the request during its traverse of the network, and then sends a reply message 220*a*.

Upon receiving the reply at the intervening node i 202, the node i 202 updates its routing table for destination d, and removes the corresponding record from the Pending-Request Table. The distances stated in various fields of the reply message informs the receiving nodes (intervening node i 202 and originating node o 201) of the new available distances. If conditions are satisfied to forward the reply, as described in more detail in the Examples Section, then the reply is forwarded to the next intervening node, if any, ultimately arriving at the origination node o 201 as reply message 220*b*

Upon receiving the reply at the originating node o 201, the node o 201 updates its routing table for destination d, and removes the corresponding record from the Pending-Request Table.

Note that every node in the ad hoc network is configured to perform as originating node, intervening node, and destination node. Any destination node can become a proactive destination node simply by transmitting proactive replies for itself periodically; and, can become an on-demand destination node again simply by stopping its transmission of such replies. To expedite neighbor discovery and make the process resilient in the presence of unreliable transmissions, each node transmits a signaling message periodically containing a gratuitous route reply message 220*c*. Reply messages, e.g., messages 220*a*, 220*b* and 220*c* among others, are collectively referenced hereinafter as reply messages 220.

FIG. 3A is a block diagram that illustrates an example signaling message 300, according to an embodiment. The message 300 includes a request originating field 302 that holds data that indicates the node o that originated the request. The message 300 includes a type field 304 that holds data that indicates whether the message 300 is a request or a reply. The message 300 includes a destination field 306 that holds data that indicates the destination node d for which routing information is requested.

The message 300 includes a reference distance field 308 that holds data that indicates a distance allowed in a reply to avoid loops, as described in more detail below and in the Examples Section.

The message 300 also includes several fields that control or track the progress of the request through the ad hoc network so that the intervening node i 202 and destination node d 209 can learn new routes as old routes degrade or nodes drop out and new nodes come into range. Thus, for example, the message 300 includes a neighbor to act field 310 that holds data that indicates next node that the sending node (e.g., intervening node i 202) knows has the best route to the destination d 209. If this is not known, then the neighbor to act field 310 holds a null value or special value that indicates any node may reply. The message 300 includes a sending node field 312 that holds data that indicates the node that sent the message 300, e.g., the originating node or one of the intervening nodes i or destination node d. The message 300 includes a previous hop field 314 that holds data that indicates the node (e.g., originating node o or intervening node i) from which the sending node received the request. As described herein, there is no such node if the sending node is the originating node o; and, in that case, the field 312 holds a special or null value indicating there was no previous hop node. The message 300 includes a distance from originating node to sending node field 320 that holds data that indicates a distance accumulated by a request message from originating node to a sending node, which is updated by each intervening node as it forwards a request. The message 300 includes a distance from destination to sending node field 322 that holds data that indicates a distance from the destination node to a sending node, which is provided by the destination in a reply or by an intervening node that has an active route to the destination node that is less than the reference distance, as described in more detail below and in the Examples Section. Field 322 appears only in a reply message and thus the field 322 is absent or holds a null value in a request message.

In the following, the index i refers to any node and not just to an intervening node 202 as depicted in FIG. 2. This is because every node is programmed to perform as originating, or intervening, or destination node, depending on the circumstances. When any node i receives a signaling message 300 from neighbor k, it processes each query and reply in the message independently of the others. The operation is here described by focusing on a particular destination d.

The information for message 300 is maintained in one or more tables 132 at each node. In an example embodiment, node i maintains four tables among tables 132 to operate, and a maximum lifetime (LT) is allowed for any table entry other than self entries, with the lifetime of each entry decremented from the moment it is created or updated. The set of neighbors of node i is denoted by $N^i$.

Figure 3B:
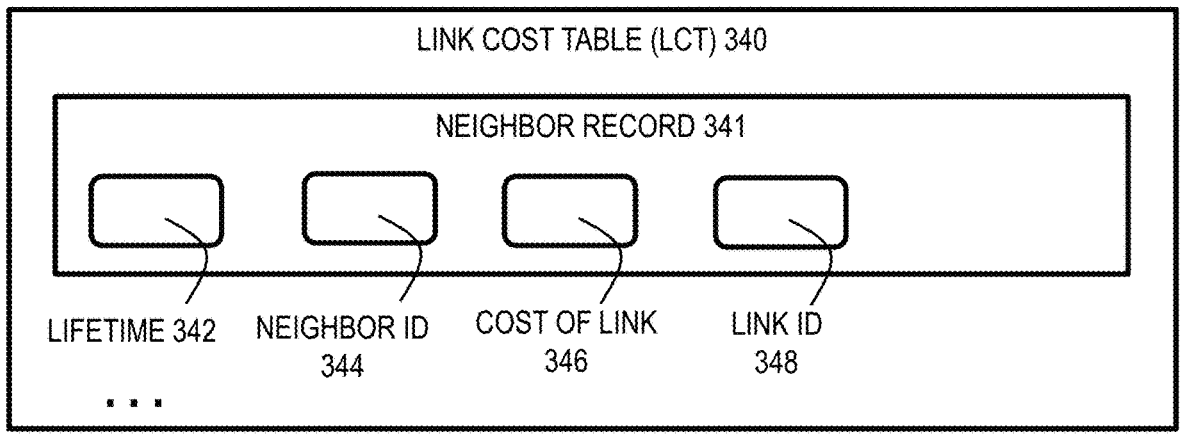
FIG. 3B is a block diagram that illustrates an example Link Cost Table, according to an embodiment.

FIG. 3B is a block diagram that illustrates an example Link Cost Table 340, according to an embodiment. The Link-Cost Table (LCTi) 340 stores the cost of each link from node i to each known neighbor in a neighbor record 341. The cost of link (i, k) is denoted by $l_k^i$. By definition, $l_k^i > 0$ for i≠k. Each neighbor record indicates the lifetime remaining for the record in field 342, an identifier for the neighbor in field 344, and the cost of the link to that neighbor in field 346. In some embodiments, there is a field 348 included to hold data that indicates the link, e.g., the logical or physical channel used to communicate with that neighbor. Ellipses indicate other records for other neighbors, if any.

Figure 3C:
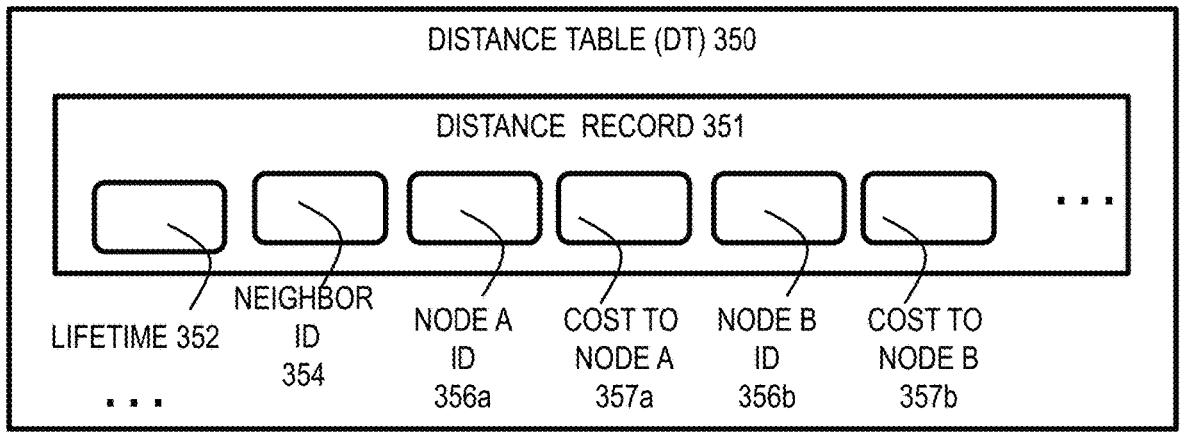
FIG. 3C is a block diagram that illustrates an example Distance Table, according to an embodiment.

FIG. 3C is a block diagram that illustrates an example Distance Table 350, according to an embodiment. An entry for destination d of $DT^i$ is denoted by $DT^i(d)$ and specifies: the identifier of destination d and the distance to d reported by each known neighbor. The distance reported by node k∈$N^i$ for destination d maintained by node i is denoted by $D_{kd}^i$. If a known neighbor q has not reported a distance for d, then it is assumed that $D_{qd}^i = \infty$. The vector of distances reported by neighbor k and stored by node i is denoted by $DT_k^i$. Each distance record 351 indicates the lifetime remaining for the record in field 352, and an identifier for the neighbor k in field 354. In some embodiments, the lifetime indicated in field 342 of record 341 is relied upon, and field 352 is omitted. The destinations for that neighbor are each represented by two fields: an identifier for the next destination d≠k, e.g., in field 356a for destination A and field 356b for destination B, among other represented by ellipsis, collectively referenced as destination node field 356; and the cost to destination d from node k for the next destination d≠k, e.g., in field 357a for destination A and field 357b for destination B, among other represented by ellipsis, collectively referenced as destination cost field 357. Ellipsis below record 351 indicate other records for other neighbors, if any.

Figure 3D:
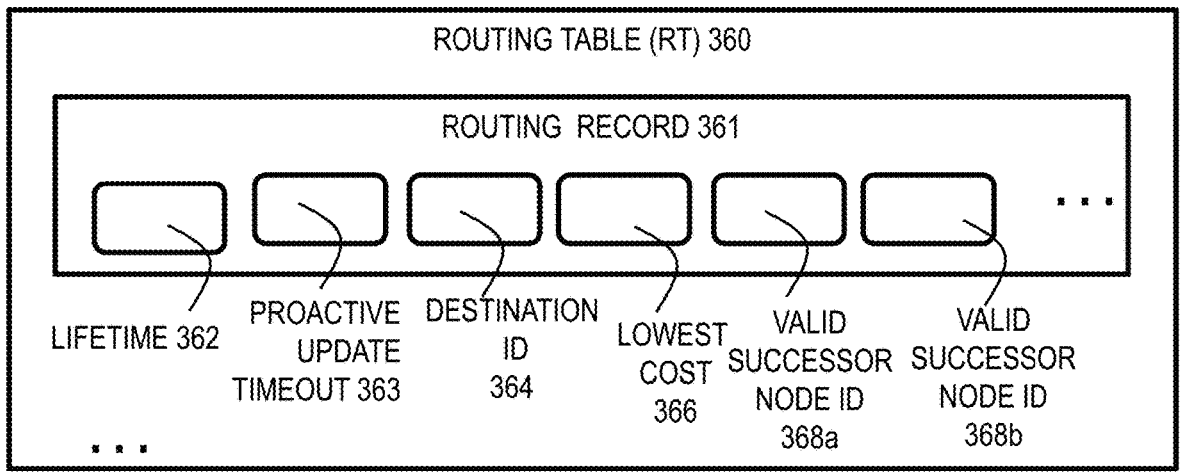
FIG. 3D is a block diagram that illustrates an example Routing Table, according to an embodiment.

FIG. 3D is a block diagram that illustrates an example Routing Table 360, according to an embodiment. The record 361 for destination d in Routing Table 360 for node i is designated $RT^i(d)$ and specifies: the identifier of destination d in field 364; the shortest distance (lowest cost) to d ($D_{min}^i$) in field 366, the set of valid successors ($S_d^i$) in field 368a for successor A, 368b for successor B, among others indicated in ellipses and collectively referenced as field 368; a proactive update timeout ($PUT_d^i$) in field 363; and a lifetime for the routing-table entry ($LR_d^d$) in field 362. Thus, an entry 362 in the current routing table expires after a maximum lifetime LT from a last update of the entry. The valid successor set $S_d^i$ is defined by Equation 1a and 1b.

$$S_d^i = \{k \in N^i | (D_{dk}^i < D_d^i) \wedge (D_{dk}^i + l_k^i = D_{min}^i(d))\} \quad (1a)$$

$$D_{min}^i(d) = Min\{D_{dn}^i + l_n^i | n \in N^i\} \quad (1b)$$

and D subscript dn indicates the distance (cost) between the node n and the destination d. The node with the smallest identifier in set $S_d^i$ is denoted by $s_d^i$. By definition, $D_d^d = 0$, $S_d^d = \{d\}$, $r_d^d = 0$, and $LR_d^d = \infty$. The proactive update timeout PUT is advantageously used because routing state for a proactive destination d desirably refreshed with enough frequency so that its state is not erased after a maximum lifetime LT. Hence, $PUT_d^i < LR_d^i$ for all i≠d. $LR_d^i$ in an existing routing-table entry for d is assumed to be reset to its maximum value of LT every time node i receives a data packet for destination d or from destination d. Ellipsis below record 361 indicate other records for other destinations, if any.

Figure 3E:
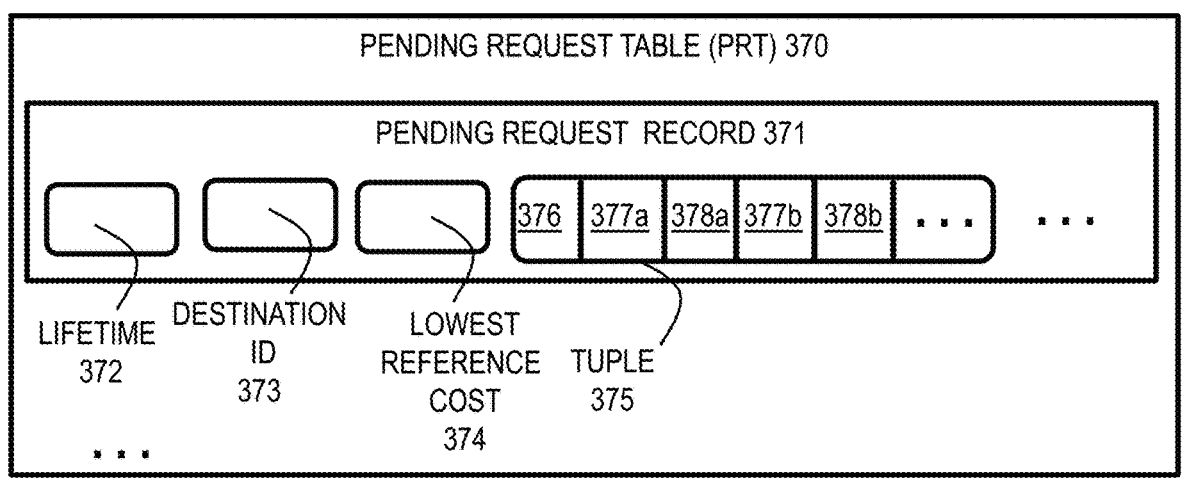
FIG. 3E is a block diagram that illustrates an example Pending Request Table, according to an embodiment.

FIG. 3E is a block diagram that illustrates an example Pending Request Table 370, according to an embodiment. This table denoted $PRT^i$ for node i, keeps track of the route requests waiting for replies. The record 371 for destination d is denoted by $PRT^i(d)$ and states: the identifier of node d in field 373; the smallest reference distance (lowest reference cost) received in a pending request from a neighbor ($RD_d^i$) in field 374; a request list $RL_d^i$ in multiple tuples, e.g., tuple 375 among others indicated by ellipsis; and a lifetime for the entry ($LP_d^i$) in field 372. Each tuple 375 in request list $RL_d^i$ includes data that indicates the identifier of the origin of a route request in field 376, and a list of identifier-distance pairs in field 377a and 378a, respectively, for neighbor A, and in fields 377b and 378b, respectively, for neighbor B, among other neighbors indicated by ellipsis for all neighbors from which the request was received, which are called herein pending-request neighbors. Fields 377a, 377b, among others indicated by ellipsis are collectively referenced as pending-request neighbor identifier fields 377. Fields 378a, 378b, among others indicated by ellipsis are collectively referenced as pending-request neighbor cost fields 378. The tuple 375 in $RL_d^i$ corresponding to origin o is denoted by $RL_d^i(o)$ and its content is $[o, PRN_d^i(o)]$ in, respectively, field 376 and following fields of tuple 375. The pair (e.g., in fields 377b and 378b) in $PRN_d^i(o)$ corresponding to neighbor k is denoted by $PRN_{dk}^i(o)$ and equals the pair $[k, PD_{ok}^i]$, where $PD_{ok}^i$ denotes the distance (cost) to origin o reported by k in its route request regarding destination d. Ellipsis below record 371 indicate other pending request records for other destinations, if any.

Besides tables 132, the routing module 130 in node i maintains in computer-readable memory or storage a field called modality flag, and designated $mod^i$, which holds data that indicates modality of the node i. For example, $mod^i = 0$ denotes on-demand routing; and, $mod^i = 1$ denotes proactive routing. In various embodiments, mechanisms that would update the value of $mod^i$ include a system administrator setting the value, or a daemon monitoring data traffic to the destination and determining that the popularity of the node, the type of traffic to the node, or the applications running at the node merit proactive routing.

Although data structures, messages and fields are depicted in FIG. 1, FIG. 2, and FIG. 3A through FIG. 3E as integral blocks in a particular order for purposes of illustration, in other embodiments, one or more data structures or messages or fields, or portions thereof, are arranged in a different order, in the same or different number of data structures or databases in one or more hosts or messages, or are omitted, or one or more additional fields are included, or the data structures and messages are changed in some combination of ways.

3. METHOD

Maintaining routing state for a destination d involves creating and processing route requests and replies, as described here.

3.1 Originating Route Request

A node i that has data for a destination d, or has an empty valid successor set after processing a proactive route reply, originates a request message 210 indicated by $REQ_d^i[Q, d, o=i, RD_d^i, D_o^i=0, p_i^d=i, f_d^i=0]$ using signal message 300 with the arguments provided in fields 304, 306, 302, 308, 320, 314, 310, respectively, when the condition of expression 2 is satisfied (true). Given that there is no request predecessor for the route request, $p_d^i=I$ in field 314, and the value $f_d^i=0$ in field 310 indicates a request for all the neighbors of node i to process the request. This is called the Originating Request Condition (ORC). Node i generates the request message 210a $REQ_d^i$ if the condition of Expression 2 is true.

$$(\nexists PRT^i(d)) \wedge ([\nexists RT^i(d)] \vee [(\exists RT^i(d)) \wedge (S_d^i=\emptyset)]) \quad (2)$$

Where $\exists$ is the symbol for "there exists," $\nexists$ is the symbol for "there does not exist," $\wedge$ is the symbol for "logical AND," and $\vee$ is the symbol for "logical OR." ORC states that a node i originates a route request if it is not already waiting for a reply regarding destination d ($PRT^i(d)$) in the pending Request Table 370 AND either it has no routing state for d ($RT^i(d)$) in the Routing Table 360 OR has routing state but has no valid successor $S_d^i$ in fields 368 for destination d.

Node i creates $PRT^i(d)$ with the identifier of node d, a value for $RD_d^i$ that depends on the routing state for d, a lifetime $RD_d^i$LTmax, and $RL_d^i(i)=[i, PRN_d^i (i)]$. The list $PRN_d^i(i)$ consists of the tuple $[i, PD_{ii}^i=0]$. Node i sets $RD_d^i=0$ if there is no entry $RT^i (d)$ to force destination d to respond to its request. On the other hand, if $RT^i(d)$ exists but $S_d^i \neq \emptyset$ (null, i.e., empty) then node i sets $RD_d^i=D_d^i$ to allow a node with a distance smaller than $D_d^i$ to respond. Node i adds the request $REQ_d^i$ to its signaling message based on $PRT^i(d)$.

Thus, a method implemented on processor of a node in an ad hoc communications network to build a routing table, includes determining a state $RT^i (d)$ of a destination node d in a current routing table $RT^i$ stored at a first node i in an ad hoc communications network. When the state of the destination node satisfies a request condition (e.g., ORC), a value for a reference distance to the destination node is determined based on a minimum distance to the destination in the current routing table. A first request message $REQ_d^i$ 210 includes a reference distance field 308 holding data that indicates the reference distance, an originating node field 302 that holds data that indicates the first node initiates the request message, a destination field 306 that holds data that indicates the destination node d, and a previous hop field 314 holding data that indicates a neighboring node from which the request is received, wherein the previous hop field 314 holds a null value. The first request message $REQ_d^i$ is sent to a different second node in the ad hoc communications network within range (i.e., a neighbor). In a pending request table $PRT^i(d)$ is stored a first record holding data that indicates at least some of the data in the request message.

3.2 Processing Route Request

If node i receives a signaling message 300 from neighbor k containing $REQ_d^k[Q, d, o, RD_d^k, D_o^k, p_d^k, f_d^k]$ in fields 304, 306, 302, 308, 320, 314, 310, respectively, node i updates $DT^i$ with $D_{ok}^i=D_o^k$, e.g., in Distance Table 350 record 351 for neighbor k as indicated in field 354, the field 357 is updated (or added) that is paired with a field 356 that indicates the ID for node o. This update is done to remember the distance (cost) to the origin of the request reported by neighboring node k, and determines whether to forward, answer, ignore, or remember the request using one of the following sufficient conditions that prevent routing-table loops by ordering nodes based on their distances (costs) to destination d.

3.2.1 Forwarding.

Node i forwards the request $REQ_d^k$ to all the neighbors of node i if the Forwarding Request Condition (FRC) given by Expression 3 is true.

$$[(\exists PRT^i(d)) \wedge ([0<RD_d^k<RD_d^i] \vee [\exists PRN_{ak}^i(o)] \vee \\ \nexists [PRN_d^i(o)]) \vee [(\nexists PRT^i(d)) \wedge ([S_d^i-\{k\}=\emptyset] \vee \\ [0<RD_d^k<D_d^i])] \quad (3)$$

The FRC states that node i should forward a route request received from a neighbor in two cases, given by the first and second lines of Expression 3, respectively. If node i is expecting a reply to a prior request for the same destination d in the Pending Request Table (PRT), then node i forwards the request if the request states a shorter reference distance $RD_d^k$ than the one currently assumed $RD_d^i$, or the request is a retransmission of a prior request from the same origin $\exists$ $PRN_{ak}^i(o)$, or the request was originated from an origin from which requests have not been received $\nexists$ $PRN_d^i(o)$. A request retransmission is recognized because k is listed as having sent a request for d from origin o.

In the second case, if node i does not expect a reply to a prior request for the same destination d, $\nexists$ $PRT^i(d)$, then node i forwards the request if either node i has no valid successor for the destination excluding neighbor k, $[S_d^i-\{k\}=\emptyset]$, or the request states a non-zero reference distance smaller than the current distance from node i to d, $RD_d^k<D_d^i$. Thus, the method includes, when data in the reference distance field 308 of the second (received) request message indicates a non-zero cost less than a cost in the current routing table 360 in record 361 for destination in field 364 to a second destination d' indicated by data in the destination field 306 of the second request message, then forwarding the second request message; and storing in the pending request table 370 a second record 371 for destination d' indicated in field 373 holding data in tuple 375 that indicates at least some the data in the second request message.

It is observed that FRC cannot be satisfied when $p_d^k=i$ because $RD_d^k \geq RD_d^i$ in that case. Hence, node i can only forward requests that are not the result of a prior request from i itself. If FRC is satisfied, node i creates or updates $PRT^i(d)$. Accordingly, node i sets $RD_d^i=\min\{RD_d^i, RD_d^k\}$, sets $LP_d^i=LT$, and updates $RL_d^i(o)$ by adding k to the list of neighbors requiring a reply, which means that $PRN_{ak}^i(o)= PRN_{ak}^i(o) \cup \{[k, PD_{ok}^i=D_o^k]\}$. Once $PRT^i$ is updated, node i computes $D_o^i=D_o^k+l_k^i$ and adds the request $REQ_d^i[Q, d, o, RD_d^i, D_o^i, p_d^i=k, f_d^i=0]$ to its signaling message 300.

3.2.2 Reset Forwarding.

Node i forwards the request $REQ_d^k$ only to the one neighbor $s_d^i \in S_d^i-\{k\}$ if the Reset Forwarding Condition (RFC) given by Expression 4 is true. Any method may be used to determine the one neighbor; here the one neighbor with the smallest node identifier is selected, which has the advantage of being simple and quick to determine because the neighbor IDs are known to the local node i.

$$(\nexists PRT^i(d)) \wedge (RD_d^k=0) \wedge (S_d^i-\{k\} \neq \emptyset) \quad (4)$$

RFC states that a node i with a valid routing-table entry for destination d (i.e., there is not a pending request for destination d, $\nexists$ $PRT^i(d)$) that receives a "reset request" (a request with a zero reference distance, $(RD_d^k=0)$) forwards the request directly to the neighbor other than k (if there is one, i.e., $(S_d^i-\{k\}16\ \emptyset)$) that has the smallest identifier among the nodes in its valid successor set.

If RFC is satisfied, node i eliminates k as a next hop to d by updating $RT^i(d)$ with $S_d^i=S_d^i-\{k\}$. Node i then creates $PRT^i(d)$ with the identifier of node d, $RD_d^i=RD_d^k=0$, $LP_d^i=LT$, and $RL_d^i$ consisting of the tuple $RL_d^i(o)=$

[o,PRN$_d^i$o)] with PRN$_d^i$(o)={[k, PD$_{ok}^i$=D$_o^k$]}. Node i computes D$_o^i$=D$_o^k$+i$_k^i$ and adds the request REQ$_d^i$[Q, d, o, RD$_d^i$, D$_o^i$, p$_d^i$=k, f$_d^i$=s$_d^i$] to its signaling message 300.

3.2.3 Ignore Request.

Node i ignores the request REQ$_d^k$ if the Ignore Request Condition (IRC) given by Expression 5 is true.

$$[(f_d^k \neq 0) \wedge (f_d^k \neq i)] \vee [(f_d^k = 0) \wedge (p_d^k = i)] \quad (5)$$

IRC states that node i ignores a route request explicitly intended for a different node or a request forwarded by a neighbor as a result of processing a request from node i itself.

3.2.4 Store Request.

Node i stores the request REQ$_d^k$ with no other action if the Store Request Condition (SRC) given by Expression 6 is true.

$$(f_d^k = 0 \wedge (p_d^k \neq i) \wedge (RD_d^k \geq RD_d^i) \wedge (\exists PRN_d^i(o)) \wedge$$
$$(\nexists PRN_{ak}^i(o)) \quad (6)$$

SRC states that node i can simply add neighbor k as a node that needs a route for destination d if node i has already forwarded a route request for destination d from the same origin stated by k, and k is not already listed as a neighbor from which a request from origin o and with a previous hop other than i has been received. If SRC is satisfied, node i updates PRT$_d^i$. Node i sets LP$_d^i$=LT and updates RL$_d^i$(o) with PRN$_d^i$(o)=PRN$_d^i$(o)∪{[k, PD$_{ok}^i$=D$_o^i$]}.

3.2.5 Reply Request.

Node i sends a reply to the request REQ$_d^k$ if the Reply Request Condition (RRC) given by Expression 7 is true.

$$[d=i] \vee [(RD_d^k \geq D_d^i) \wedge (\nexists PRT^i(d))] \vee [(f_d^k = i) \wedge (S_n^i = \emptyset)] \quad (7)$$

According to RRC, node i can answer a request in three cases. Node i can reply independently of the reference distance stated in the request if node i is the intended destination d. Node i can also reply if node i is not waiting for a reply for a route to d and node i is closer to d than the reference distance stated in the request. Node i also replies if the request is explicitly directed to itself (i.e., f$_d^k$=i) and node i does not have a valid successor to destination d (i.e., S$_d^i$=∅), in which case node i informs k that D$_d^i$=∞. If RRC is satisfied, then node i can update its routing table regarding origin o. To do so, node i uses Equation 1b and 1a to compute D$_{min}^i$(o) and S$_o^i$, and node i updates D$_o^i$=D$_{min}^i$(o)). Node i then includes the reply REP$_d^i$[R, d, o, RD$_d^i$=D$_d^i$, D$_d^i$, D$_o^i$] in fields 304, 306, 302, 308, 322, 320, respectively, in its signaling message 300 as reply 220a. This reply is processed by receiving nodes as described below with reference to section 3.4.

Thus, if node i is the intended destination d., node i_receives a different second request message than any request node i_generated for a destination d. This request message is received from a third node k' in the ad hoc communications network within range (thus k' is a neighbor of i). This third node k' is different from the first node i, and the second request message includes a sender distance field 320 that holds data that indicates a cost to the third node from a fourth node o indicated in the originating node field 302 of the second request message. When data in the destination field 306 of the second request message (e.g., d') indicates the first node, i.e., when d'=i, then node i determines a destination cost by adding the cost to the third node k' from the fourth node o to a cost from the third node k' to the first node i. The first node i forms a different second reply message that includes a destination distance field 320 holding data that indicates the destination cost; and sending the second reply message to the third node k'.

If on the other hand, node i is not waiting for a reply for a route to d and node i is closer to d than the reference distance, then node i can also reply. Thus, when data in the destination field 306 of the second (received) request message indicates a second destination d' different from the first node (d'≠i) and data in the reference distance field 308 of the second request message indicates a cost greater than a cost in field 366 in the current routing table record 361 to the second destination, then: determining a destination cost by adding the cost to the third node from the fourth node in field 320 and the cost from the third node to the first node in field 346 from the link cost table and the cost in field 366 of the current routing table to the second destination. Node i forms the second reply message that includes the destination distance field holding data that indicates the destination cost using one or more fields in the second reply message (e.g., field 320 in second reply=cost from field 320 in received request plus cost in field 346; and field 322 in second reply=cost from field 366 of current routing table); and sending the second reply message to the third node k'.

3.3 Originating Proactive Replies

Any destination can become a proactive destination simply by transmitting proactive replies 220c, also called gratuitous replies, for itself periodically; and, can become an on-demand destination again simply by stopping its transmission of such proactive replies. The following conditions define the transmission of proactive replies by nodes.

Destination node d announces itself by originating a proactive reply of form REP$_d^d$[R, d, o=d, RD$_d^d$=0, D$_d^d$=0, D$_o^i$=0] in fields 304, 306, 302, 308, 320, 322, respectively if the Proactive Reply Condition (PRC) given by Expression 8 is true.

$$(mod^d = 1) \wedge (PUT_d^d = 0) \quad (8)$$

PRC simply states that a proactive destination issues a proactive reply for itself periodically every RT$_d^d$ seconds. Node d sets PUT$_d^d$=0 the first time that node d sets mod$^d$=1, so that PRC is satisfied immediately. Node d resets the value of PUT$_{ci}^d$ to the maximum value (less than the maximum refresh time LT) after it sends its proactive reply, so that periodic reply transmissions take place.

Thus, in some embodiments, the method includes forming a different second (proactive) reply message that includes a reference distance field 308 holding data that indicates a null value; and, sending the second reply message at intermittent times PUT to every node in the ad hoc communications network within range.

3.4 Processing Replies

Nodes process replies opportunistically, given that all signaling messages are sent in broadcast mode. Nodes are allowed to add new routing-table entries only after receiving proactive replies or replies that answer requests they have originated or forwarded. Nodes can update existing routing-table entries after receiving subsequent replies.

3.4.1 Use Reply.

When node i receives the reply of form REP$_d^k$[R, d, o, RD$_d^k$, D$_d^k$, D$_o^k$] in fields 304, 306, 302, 308, 322, 320, respectively, from neighbor k, then node i first updates DT$^i$ by setting D$_{dk}^i$=D$_d^k$ and D$_{ok}^i$=D$_o^k$. Node i then can determine if k∈S$_d^i$ and uses the following condition to determine if node i can use the reply from node k to answer its own request, or improve the information about distances (costs) from node i to either destination d or origin o if those costs are already instantiated in RT$^i$, or update the routing state at node i for a proactive destination d.

3.4.2 Accept Reply.

Node i accepts a reply $REP_d^k$ if the Accept Reply Condition (ARC) given by Expression 9 is true.

$$[d=o] \lor [(d \neq o) \land (\not\exists PRT^i(d)) \land (D_d^k < D_d^i)] \lor [(d \neq o) \land (\exists PRT^i(d)) \land (RD_d^k < RD_d^i)] \quad (9)$$

ARC states that node i accepts a reply from neighbor node k if the reply is proactive (i.e., d=o), the reply is for an on-demand destination and node k is closer to the destination d and node i is not waiting for replies, or the reply is for an on-demand destination and satisfies the reference distance stated in an existing pending request from node i. The steps taken when ARC is satisfied are the following under several subsets of conditions.

3.4.2.1 Case 1.

Case 1 occurs when d=o and $PRT^i(d)$ does not exist. If $RT^i(d)$ does not exist, then node i creates an entry for it. Node i uses Equation 1b and 1a to compute $D_{min}^i(d)$ and $S_d^i$, respectively. If $D_{min}^i(d) \neq D_d^i$, then node i updates $D_d^i = D_{min}^i(d)$. Given that the proactive reply was created by d, node i can trust the reply even if $D_{min}^i(d) > D_d^i$ and k must be in $S_d^i$. Node i adds the proactive reply $REP_d^i[R, d, o, RD_d^i=0, D_d^i, D_d^i]$ to its signaling message 300 if $D_{min}^i(d) \neq D_d^i$.

3.4.2.2 Case 2.

Case 2 occurs when d=o and $PRT^i(d)$ exists. Node i uses received reply $REP_d^k$ as an answer to a request from node i itself in this case because $RD_d^k=0$ and hence $RD_d^k \leq RD_d^i$. Because $D_d^k < \infty$, node i sets $D_{min}^i(d) = D_{jk}^i + l_k^i$ to reset the distance used to define valid successors, which results in $S_d^i = \{k\}$ according to Equations 1a and 1b. Node i updates $RT^i$ with $D_d^i = D_{jk}^i + l_k^i$ and $S_d^i$. Node i also adds the proactive reply $REP_d^i[R, d, o=d, RD_d^i=0, D_d^i, D_d^i]$ to its signaling message 300.

3.4.2.3 Case 3.

Case 3 occurs when d≠o and $PRT^i(d)$ does not exist. Node i does nothing else in this case if $RT^i(d)$ and $RT^i(o)$ do not exist. Alternatively, node i uses Equations 1a and 1b to compute $D_{min}^i(d)$ and $S_d^i$ if $RT^i(d)$ exists, and to compute $D_{min}^i(o)$ and $S_o^i$ if $RT^i(o)$ exists. If $D_{min}^i(d) \neq D_d^i$ or $D_{min}^i(o) \neq D_o^i$, node i updates $D_d^i = D_{min}^i(d)$ and $D_o^i = D_{min}^i(o)$ as needed. Node i adds the gratuitous reply $REP_d^i[R, d, i, R_d^i = D_d^i, D_i^i]$ to its signaling message 300 if $RT^i(d)$ is updated, and adds the gratuitous reply $REP_o^i[R, o, i, RD_o^i = D_o^i, D_o^i, D_i^i]$ to its signaling message 300 if $RT^i(o)$ is updated.

3.4.2.4 Case 4.

Case 4 occurs when d≠o and $PRT^i(d)$ exists. That is, the reply is for a request originated by the node i or forwarded by node i. Node i uses received reply $REP_d^k$ as an answer to its own request in this case. If $D_d^k < \infty$, node i updates $RT^i$ with $D_d^i = D_{jk}^i + l_k^i$ and $S_d^i = \{k\}$, else $D_d^k = \infty$ and hence node i updates $RT^i$ with $D_d^i = \infty$ and $S_d^i = \emptyset$.

Node i updates or creates $RT^i(o)$ by computing $D_{min}^i(o)$ and $S_o^i$ using Equations 1a and 1b and sets $D_o^i = D_{min}^i(o)$. Furthermore, for each origin p for which there is an entry $RL_d^i(p)$ in $PRT^i$, node i updates or creates $RT^i(p)$ by computing $D_{min}^i(p)$ and $S_p^i$ using Equations 1a and 1b, and sets $D_p^i = D_{min}^i(p)$. Node i also adds the reply $REP_d^i[R, d, o, RD_d^i = RD_d^k, D_d^i, D_o^i]$ to its signaling message 300 if either $PRN_{dq}^i(o)$ exists for $q \in N^i$ or node$^i$ updated $D_d^i$ or $D_o^i$. Node i then deletes $PRT^i(d)$.

Thus, node i receives a first reply message in response to sending the first request message; and, in response to receiving the first reply message, node i removes the first record in the pending request table; and updates the current routing table based on the reply message.

3.5 Handling Link Changes

To expedite neighbor discovery and make ODVR resilient in the presence of unreliable transmissions, each node transmits a signaling message periodically containing a gratuitous route reply $REP_i^i[R, d, o, RD_d^i, D_d^i, D_o^i]$ for itself with $RD_i^i = D_i^i = D_o^i = 0$.

To address the fact that signaling messages may be lost, node i also adds a gratuitous route reply $REP_d^i[R, d, o, RD_d^i, D_d^i, D_o^i]$ with o=i, $RD_d^i = D_d^i$ and $D_o^i = 0$ for each destination d in $RT^i$. To reduce the size of signaling messages, node i can simply include a hash value of the content of $RT^i$ if it makes no changes to $RT^i$ from the time it sent its previous signaling message.

Link additions are detected through the reception of signaling messages. Link failures are detected either through the link layer or as a result of a node not receiving any data packets or signaling messages from a neighbor for a period of time corresponding to the time needed to transmit two or three consecutive signaling messages periodically.

If node i detects a change in the cost of link(i, k), it computes $D_{min}^i(d)$ and $S_d^i$ for each destination d for which an entry $RT^i(d)$ exists using Equations 1a and 1b. In addition, for each destination d for which there is an entry $RT_i(d)$ such that $S_d^i \neq \emptyset$ and $D_{min}^i(d) \neq D_d^i$, node i updates $D_d^i = D_{min}^i(d)$ and adds a gratuitous reply $REP_d^i[R, d, o=i, RD_d^i = D_d^i, D_d^i, D_o^i = 0]$ to its signaling message 300.

If node i detects that the link (i, k) has failed, it sets $l_k^i = \infty$ in $LCT^i$ and treats the link failure as a link-cot change. The entry $D_{kd}^i$ for each destination d is deleted after its lifetime expires.

3.6 Handling Node Reboots

Records in $DT^i$, $RT^i$, and $PRT^i$ have finite lifetimes to allow node i to delete entries that become obsolete as a result of topology changes. This is called a soft-state protocol. Node i renews the lifetime of $RT^i(d)$ with every data packet it processes for destination d and deletes the entry if no data traffic is received for d during the lifetime of the entry. If entry (e.g., record) $RT^i(d)$ is deleted due to timeout, node i also deletes entry $DT^i(d)$. The entry $PRT^i(d)$ expires when $LP_d^i$ reaches 0. Node i deletes the entry if this is the case and sets $S_d^i = \emptyset$ if $RT^i(d)$ exists. If node i is a source of data for destination d, node i can schedule the transmission of a new route request for d according to the ORC.

If node i is asked to forward a data packet to destination d and $RT^i(d)$ does not exist or $S_d^i = \emptyset$, node i adds the gratuitous route reply $REP_d^i[R, d, oi, RD_d^i, D_d^i, D_o^i]$ with o=i, $RD_d^i = D_d^i = \infty$ and $D_o^i = 0$ to its signaling message 300.

If node i initializes or reboots, it only has routing state for itself. It is assumed that $S_d^i = \emptyset$ and $D_d^i = \infty$ for any destination for which node i has no routing state.

3.7 Loop-Free Routes

A distributed routing algorithm (DRA) is said to be loop-free if it is able to maintain loop-free routes at every instant while the network is subject to any sequence of link or node failures and recoveries, message losses, and loss of routing state at any node. For a DRA to obtain shortest paths and be loop-free, it must establish a strict total ordering of the nodes with respect to any given destination d based on a strict ordering constraint that establishes an asymmetric relation between each node k and any neighbor that it chooses as a next hop to d, which is denoted by $s_d^k$.

In the related application incorporated by reference above, it is shown that prior art approaches cannot guarantee loop-free routes in the presence of node dropouts and lost signaling messages. Furthermore, it is there proven that the techniques described herein do guarantee loop-free routing tables at every instant, even in the presence of node dropouts and lost signaling messages. However, because neither proof is needed to understand or practice embodiments of the invention, those proofs are not repeated here.

4. EXAMPLE EMBODIMENTS

An example embodiment called Ordered Distance Vector Routing (ODVR) is worked out here in detail with a variety of different conditions. This example embodiment combines the benefits of on-demand and proactive loop-free routing. The statements made herein apply only to the ODVR embodiment.

It could be argued that developing an integrated approach to on-demand and proactive loop-free routing could be attained by modifying the basic destination-based sequence numbering approach used in AODV (Ad-hoc On-Demand Distance Vector) [23] and DSDV (Destination-Sequenced Vector Routing) [22]. However, routing-table loops can occur in AODV. More importantly, Inventors have noted that loop-free routing cannot be attained based on the signaling and destination sequence numbering used in AODV in a network in which relay nodes send back replies, messages can be lost, and nodes may lose routing state. On the other hand, all other prior loop-free routing approaches incur much more communication overhead than simply communicating distances on a best-effort basis. The known schemes are: using source routes in routing updates and data packets [13], including path information or topology information in routing updates [5], [20], and requiring a router that sends a route request to wait for replies from all its neighbors before making changes in its routing table [24].

The design of ODVR is motivated by three facts: (a) Destination sequence numbers are neither necessary nor sufficient to attain on-demand or proactive loop-free routing; (b) no prior loop-free routing protocol exists that uses only distances to destinations and does not require synchronizing routing-table updates; and (c) no routing modality is inherently better than the other.

The operation of ODVR has three novel components: (a) Distance-based multi-path loop-free routing without destination sequence numbering; (b) route-request forwarding without sequence numbering of requests; and (c) dynamic choice of routing modality on a per destination basis.

ODVR operates by establishing a strict total ordering of nodes with respect to individual destinations using only distance values (as a specific actual distance embodiment of generic distance defined in previous sections to include any measure of cost). This strict total ordering is enforced by having each route request and reply state a reference distance to the intended destination. A node must forward a route request stating a smaller reference distance than its current distance or reference distance, and adopts the smaller reference distance stated in the forwarded request as its new reference distance. A node trusts only replies stating a reference distance smaller than or equal to the reference distance it requires. A node that sends a route request regarding a destination for which it has no routing state must use a reference distance of 0 to force the destination to answer the request. This allows nodes to lose routing state without causing routing-table loops when they recover. To save bandwidth, a relay node with a valid routing table entry for a destination that receives a route request with a reference distance of 0 forwards the request only to its best next hop. This is done by indicating in a route request either the specific neighbor that should process the request or a broadcast address.

Using Pending Request Tables (PRTs) eliminates the need for sequence numbers to identify route requests. Each route request states the previous hop traversed by the request, and PRT's are maintained and used by nodes to process route requests and to add or update routing table entries. A node adds a routing table entry for a destination only when the node answers a route request or receives a reply to a pending route request. A node can update an existing routing table entry when it receives a reply regarding that entry. A node forwards a reply only if it is a proactive reply or the node has neighbors that forwarded requests stating prior hops for their requests that are different from the node itself. To avoid deadlocks when requests are lost, a node forwards all retransmissions of requests received from its neighbors, provided that they state previous hops traversed by the requests other than the node itself. It is up to the nodes originating of requests to moderate the rate at which they retransmit their requests.

By default, routes to destinations are maintained on demand through route requests and replies. A destination can change to proactive mode by issuing proactive route replies for itself periodically, with each reply stating a reference distance value of 0. The destination returns to the on-demand routing modality simply by not originating more proactive route replies for itself. A router forwards a proactive reply for a destination received from a neighbor k, if k is closer to the destination and provides the shortest distance to it. The rest of the signaling and mechanisms are the same for on-demand and proactive routing.

Signaling messages 300 are transmitted in broadcast mode among neighboring nodes. A signaling message 300 sent by node i at time t is denoted by $SM^i(t)$ and contains the identifier of the node (i) and one or multiple update entries, each of which can be either a request message 210 (REQ) for a route or a reply message 220 (REP) 220 to a request message 210

The notation $REQ_d^i[Q, d, o, RD_d^i, D_o^i, p_d^i, f_d^i]$ denotes a route request 210 sent by node i for destination d originated by node o. In this tuple, Q states that the message 300 is a request by a value in field 304, d is the destination identifier indicated in field 306, o is the identifier of the origin of the request indicated in field 302, $RD_d^i$ is a reference distance to d indicated in field 308 and used to prevent routing loops, $D_o^i$ is the distance attained by node i to the origin of the request as indicated in field 320, $p_d^i$ denotes the request predecessor (i.e., the neighbor from which node i received the request before forwarding it) as indicated in field 314, and $f_d^i$ states the neighbor(s) of node i that must process the request as indicated in field 310, and, of course, i is indicated in field 312. If $f_d^i=0$, then the request 210 should be processed by every node that receives the request 210, e.g., within range 111 of node i.

The notation $REP_d^i|R, d, o, RD_d^i, D_d^i, D_o^i|$ denotes a reply 220 sent by node i for destination d. The value R states that the message 300 is a reply by a value in field 304, sending node i is indicated in field 312, d is the destination identifier indicated in field 306, o is the identifier of the origin of the request indicated in field 302, $RD_d^i$ is the reference distance of the node that originated the reply as indicated in field 320, $D_d^i$ is the distance attained by node i to destination d as indicated in field 322, and $D_o^i$ is the distance attained by node i to the origin of the request o as indicated in field 320.

Performance data for a simulation of signaling traffic in a dynamic ad hoc communications network is presented here. These simulations show that ODVR is more efficient than previous approaches, even more than previous approaches using hybrid proactive and on-demand routing.

The performance of ODVR, in both on-demand and proactive modes, is compared with the performance of an Ad-hoc On-Demand Distance Vector protocol (AODV) [23], and an Optimized Link State Routing protocol (OLSR) [5], using simulations in a network simulator (ns3.24). ODVR was implemented in the ns3.24 simulator; and the ns3 implementations of AODV and OLSR were used without modifications. OLSR uses HELLO messages to discover and check neighbor connectivity and Topology Control (TC) messages to disseminate link-state information throughout the network. To reduce signaling overhead, OLSR takes advantage of connected dominating sets. Some nodes are elected as multipoint relays (MPRs) and only MPRs forward TC messages, and only link-state information needed to connect MPRs is advertised in the network. Nodes do not fail and never lose the routing state they acquire during the simulation runs. This is done to illustrate the efficiency of ODVR relative to AODV and OLSR even when routing-table loops are unlikely to occur in AODV, and when no resets of sequence numbers occur in OLSR due to node failures.

Table 1 shows the summary of simulation-environment settings for the three routing protocols. Different scenarios were considered to study the behavior of routing protocols with respect to mobility and number of data flows. The scenarios were chosen to stress the signaling of all three protocols, rather than to attain good packet delivery rates.

TABLE 1

Simulation parameters.

| Parameter name | Value and units |
|---|---|
| Topology area | 500 × 1500 meters |
| Number of nodes | 50 |
| Transmission range | 250 meters |
| Simulation duration | 1000 seconds |
| Bandwidth | 2 Million bits per second (Mbps) |
| Hello interval | 2 seconds |
| Topology Control message (TC) interval (OLSR) | 5 seconds |
| Update interval (ODVR) | 2 seconds |
| Route timeout | 3 seconds |
| Queue length | 64 |
| Request rate | 10 per second |
| Maximum retries | 2 |

Three metrics were considered to analyze the performance of routing protocols: Data packet delivery ratio (DPDR), signaling overhead (hereinafter "overhead" for short), and end-to-end delay. DPDR indicates the number of packets received by destination routers divided by number of packets sent by the source routers. The overhead is the total number of routing message (in bytes) during the simulation. The overhead in AODV includes its five types of packets: requests, replies, error messages, ACKs to replies, and HELLO messages. The overhead in OLSR includes topology change (TC) messages and HELLO messages. The overhead of ODVR includes all the request and reply messages it broadcasts. Average delay is the average delay incurred in transmitting a data packet until it reaches its destination, and includes all delays incurred by buffering the packet during the route discovery phase, queuing at the output queues, propagation delays and transmission times.

The simulated network consists of 50 nodes spread uniformly and randomly in a 500×1500 m area at the beginning of the simulation run. Nodes start each experiment at random locations within the simulation area and move as defined by the random waypoint model, in which each node selects a random destination within the working area and moves linearly to that location at a predefined speed. After reaching its destination, it pauses for a specified time period (pause time) and then selects a new random location and repeats the same process. The scenarios include 25 data flows from 25 different sources to different destinations chosen randomly. Source nodes generate traffic at a rate of 15 packets per second each. The number of flows varies in the scenario in which we measure the effect of the number of flows.

A subset of nodes are selected as popular destinations. It is assumed that six nodes are popular and 75% of the traffic is targeted to the popular nodes. The popular nodes are selected randomly at the beginning of each simulation run. Traffic sources are on-off applications with on and off times of one second each, and generate packets of size 512 bytes at a rate of 15 packets per second. The data packets flow for 200 seconds and then new data flows are generated by selecting new sources and new destinations. New data flows are generated every 200 seconds after that.

Simulation results are present for two versions of ODVR. The results labeled as ODVR-od correspond to the performance of ODVR when only on-demand routing is used, and the results labeled ODVR correspond to ODVR with integrated proactive and on-demand routing. As the simulation results illustrate, ODVR is far more efficient than traditional on-demand and proactive routing exemplified by AODV and OLSR, respectively, and the integrated routing approach in ODVR results in better performance than the exclusive use of on-demand signaling in ODVR.

4.1 Effect of Mobility

The effect of mobility on the performance of ODVR, AODV and OLSR is demonstrated by changing the pause time and speed of nodes. The speed with which nodes move is another parameter in mobility, and higher speed means more topology changes in the network. In a first mobility experiment, the speed of the nodes in the mobility model varies from 1 meter per second (m/s) to 20 m/s to illustrate low and high mobility.

Figure 5A:
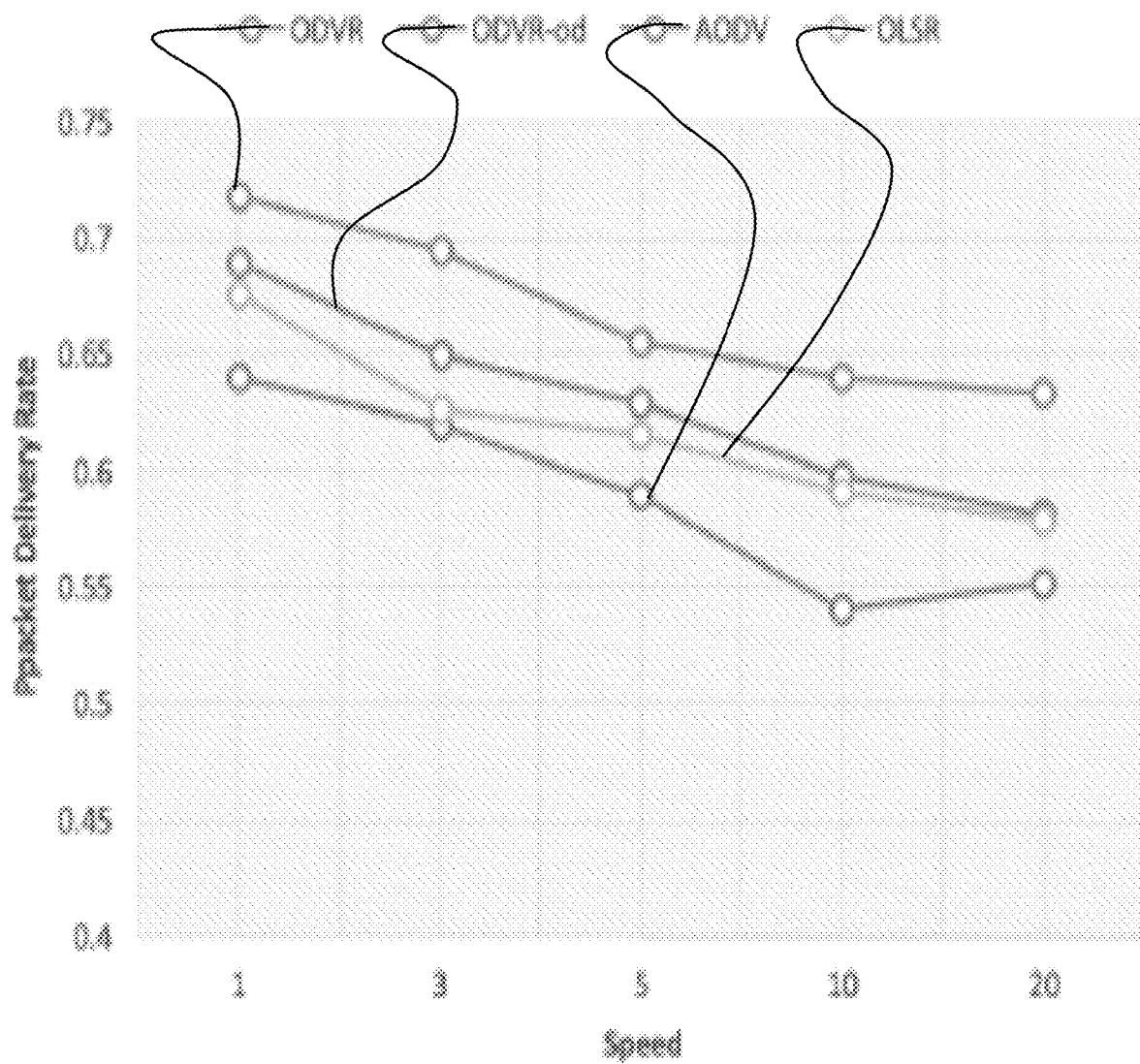
FIG. 5A through FIG. 5C are graphs that illustrate example favorable performance of an example embodiment compared to prior approaches as a function of node speed using three different performance measures, respectively; according to an example embodiment.
Figure 5B:
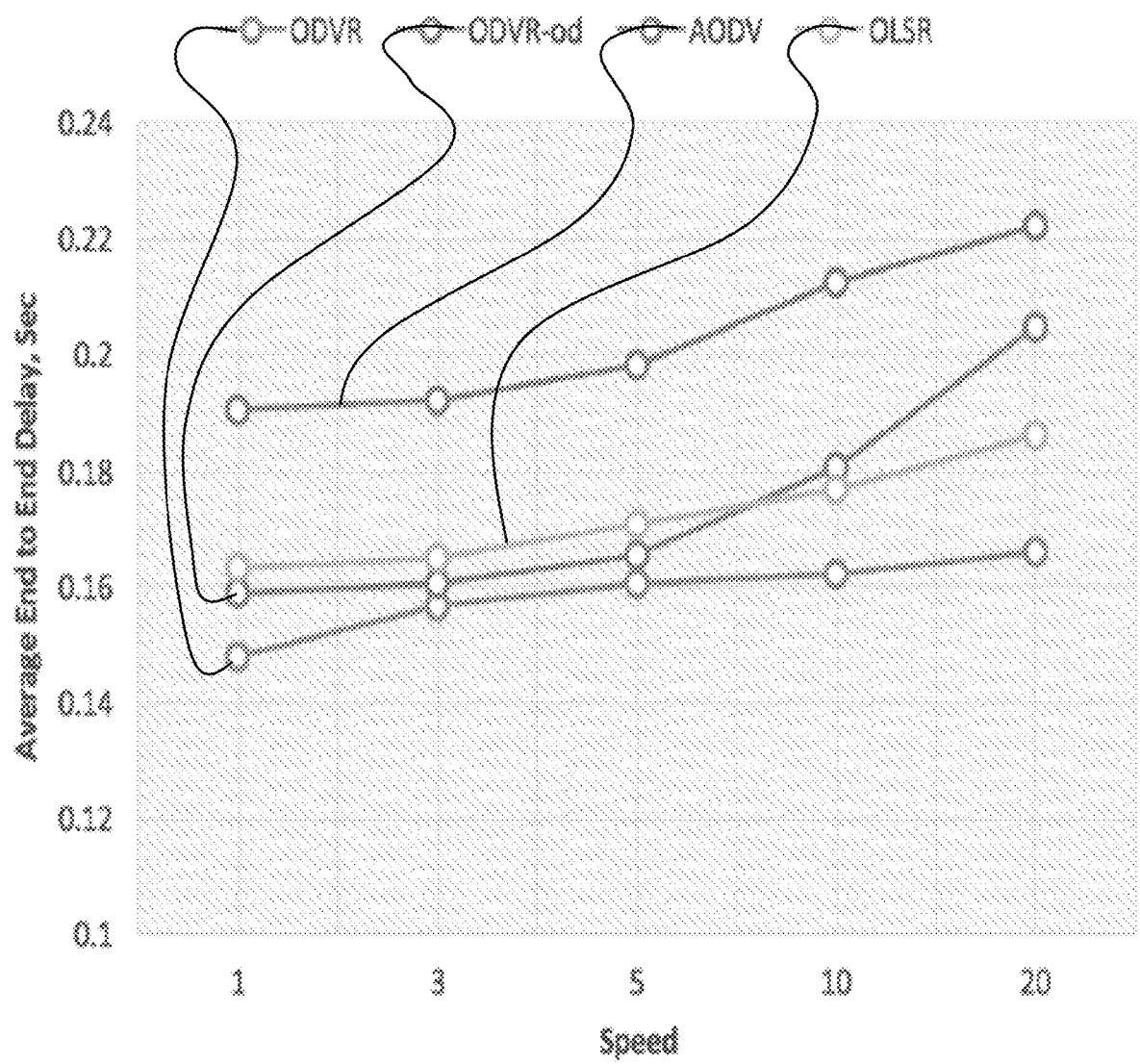
Figure 5C:
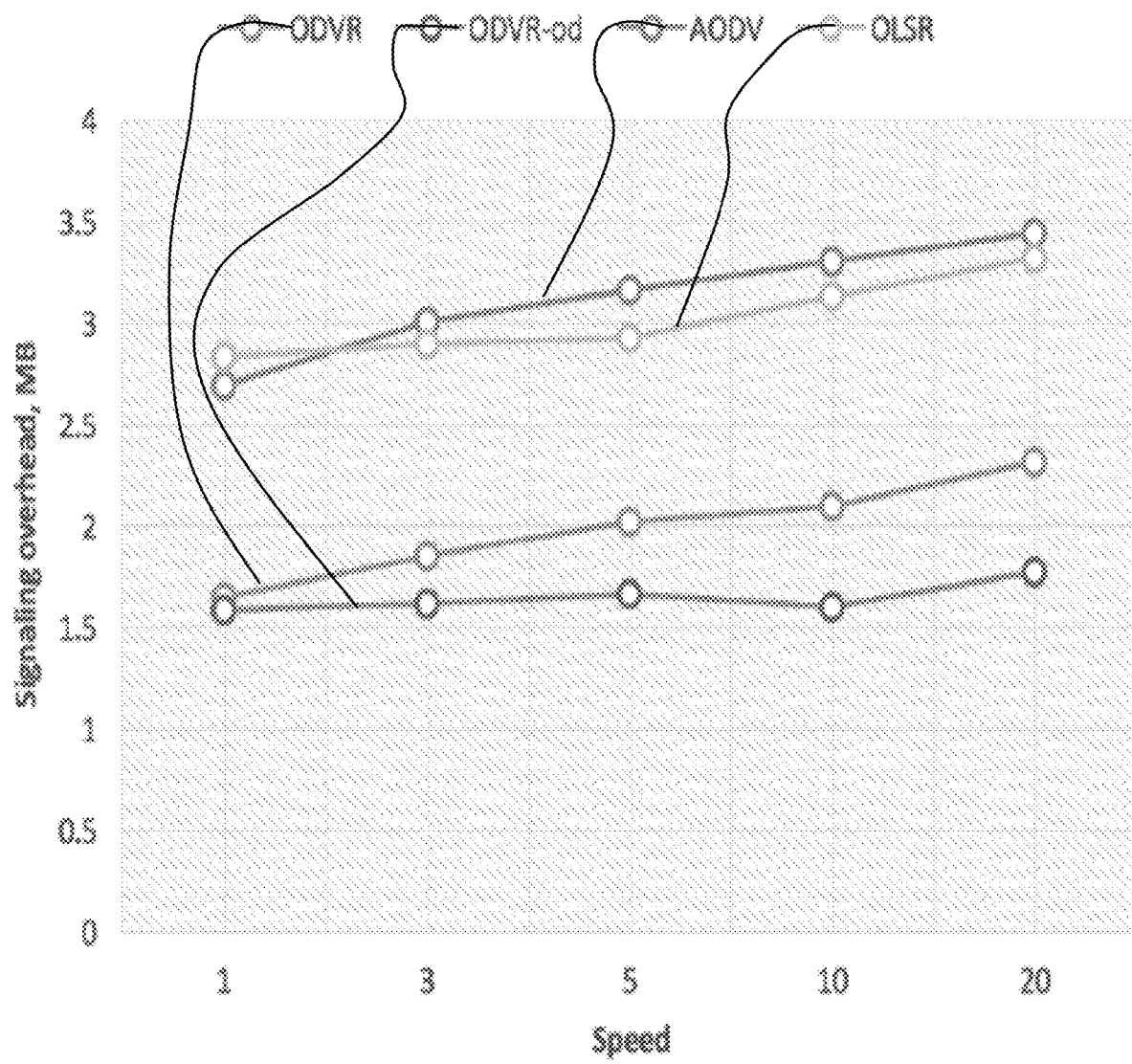

FIG. 5A through FIG. 5C are graphs that illustrate example favorable performance of an example embodiment compared to prior approaches as a function of node speed using three different performance measures, respectively; according to an example embodiment. These figures show the performance results as functions of node speed. In FIG. 5A the horizontal axis indicates node speed in m/s and the vertical axis indicates packet delivery rate (the ratio of the number of packets delivered divided by the total number of transmitted packets (dimensionless). The packet delivery rate decreases as the speed of nodes increases because more topology changes occur. Routes break due to topology changes and packets are dropped until the routing protocol finds a new route.

In FIG. 5B the horizontal axis indicates node speed in m/s and the vertical axis indicates average end-to-end delay in seconds. OLSR detects a link failure after failing to receive HELLO messages and sends TC messages to inform all routers of the topology so that new routes can be established. Given that TC messages include all changes that take place between periodic updates, the signaling overhead increases to address topology changes in the network. A link failure is detected in AODV by the absence of a number of consecutive HELLO messages, and a route discovery process is performed to establish new routes between sources and destinations. Link failures in ODVR can be detected by the absence of a number of consecutive gratuitous replies when proactive routing takes place, and a route discovery process is performed to establish new route between source and destinations for the proactive route. The discovery process for an on-demand destination is initiated in ODVR only when there is data traffic for the destination. Because of the delays incurred in detecting link failures and in establishing new routes after that, as router speed increases more and more data packets traversing failed routes end up being dropped and thus increasing the delay time in completing a transmission. Thus, as shown in FIG. 5B, ODVR again outperforms AODV and OLSR with both ODVR embodiments having about half the delays, and with ODVR-on-demand subjected to the fewest delays.

In FIG. 5C the horizontal axis indicates node speed in m/s and the vertical axis indicates signaling overhead in Mega-Bytes (MB, 1 MB=$10^6$ bytes, 1 byte=about 8 bits). As the plots indicate, ODVR incurs less overhead compared to AODV and OLSR. This is in part due to the fact that ODVR has smaller signaling packets compared to AODV, which needs the sequence number of both source and destination. More importantly, in OLSR, TC messages must be disseminated by MPRs throughout the network, and each REQ in AODV is flooded throughout the network. By contrast, a route request in ODVR is propagated only to a small part of the network, because a relay can reply if it is closer to the destination than the reference distance stated in the route request. This also results in shorter search times and smaller end-to-end delays in ODVR compared to OLSR and AODV (as shown above with reference to FIG. 5B). The signaling overhead in ODVR-od is even less than in ODVR, because only those nodes that have active routes to destinations send route requests.

4.2 Effect of Pause Time

Figure 6A:
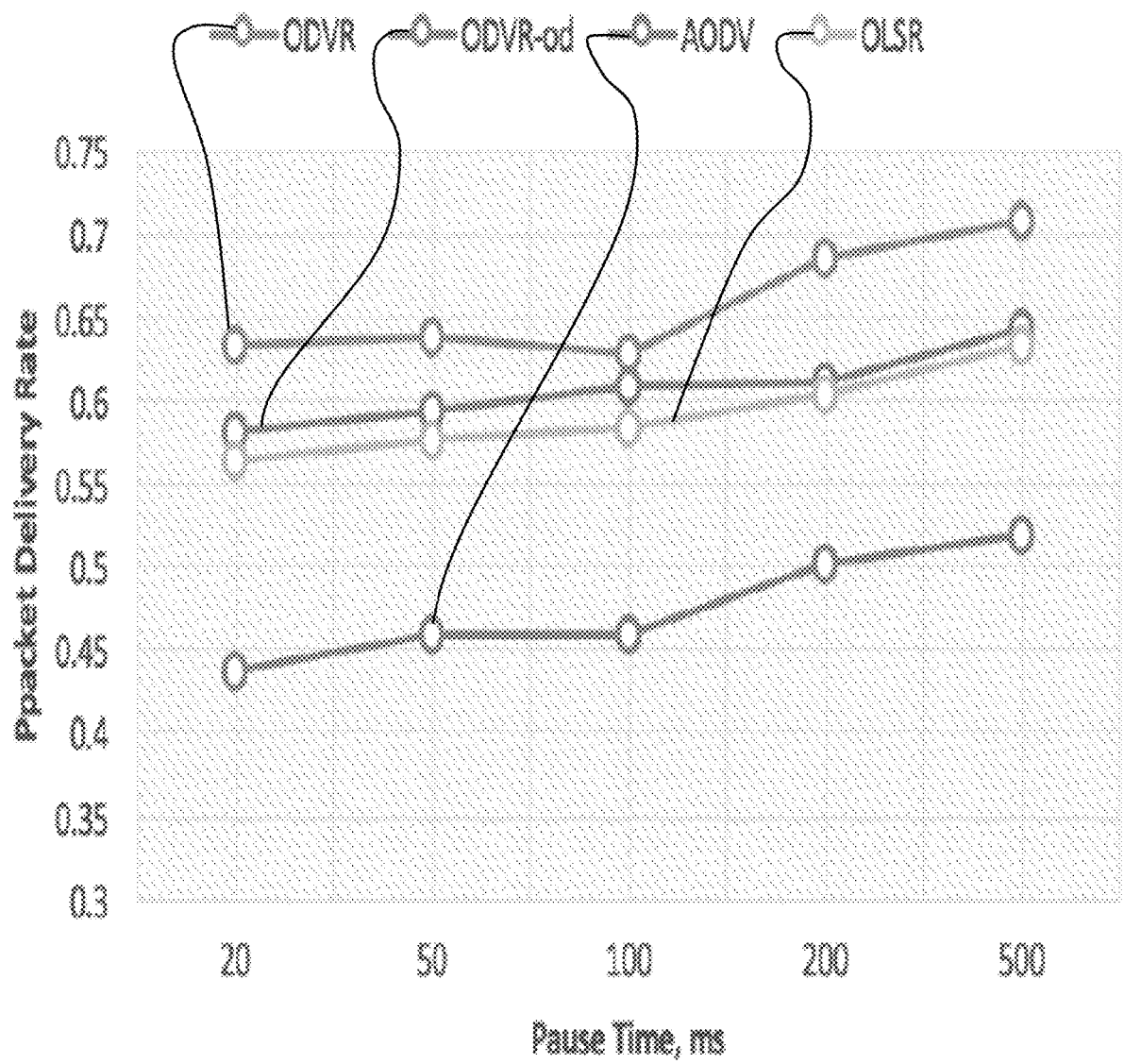
FIG. 6A through FIG. 6C are graphs that illustrate example favorable performance of an example embodiment compared to prior approaches as a function of node pause time using three different performance measures, respectively; according to an example embodiment.
Figure 6B:
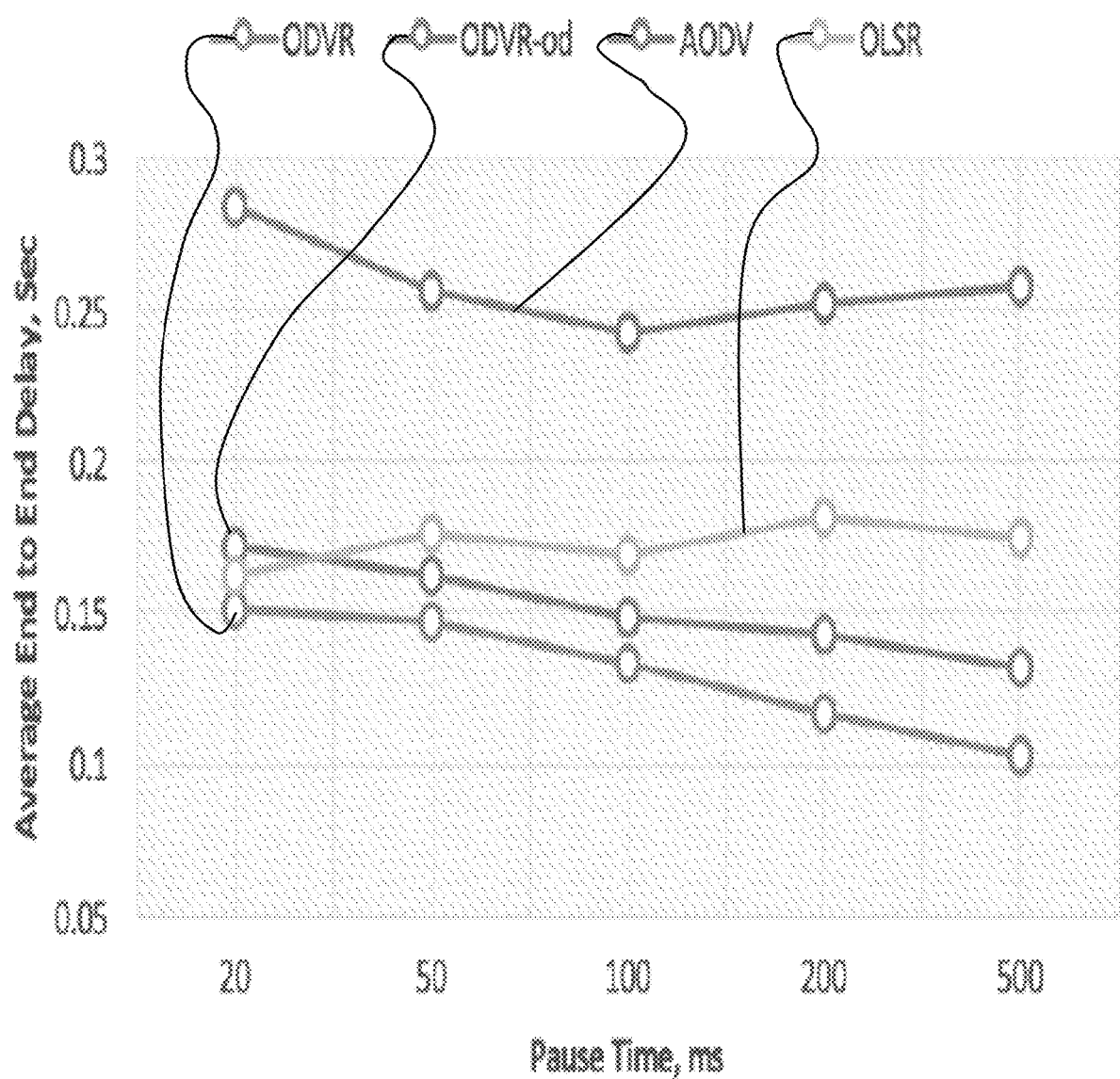
Figure 6C:
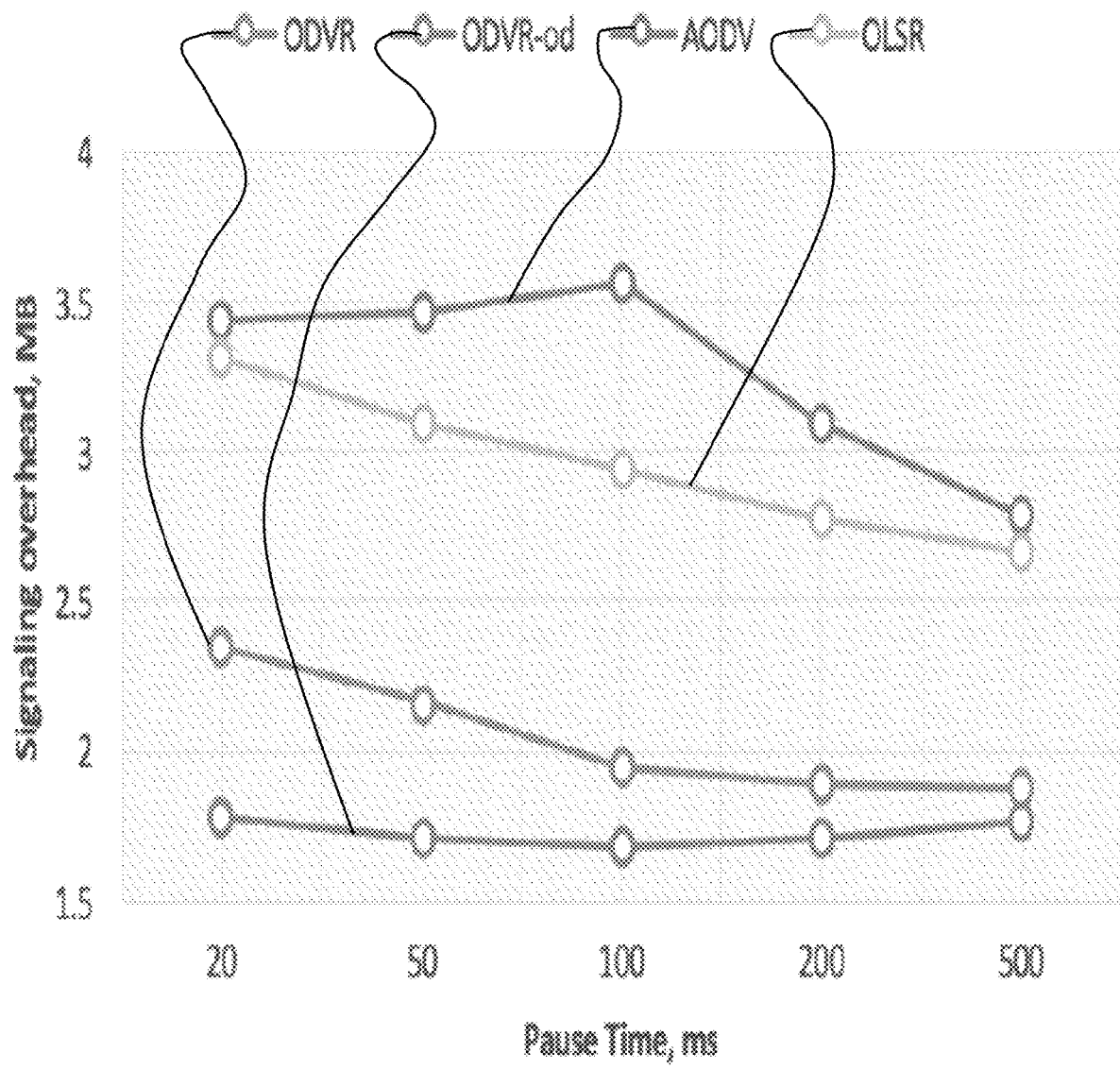

FIG. 6A through FIG. 6C are graphs that illustrate example favorable performance of an example embodiment compared to prior approaches as a function of node pause time using three different performance measures, respectively; according to an example embodiment. The horizontal axes indicate node pause time in milliseconds (ms, 1 ms=$10^{-3}$ seconds). In FIG. 6A the vertical axis indicates packet delivery rate in arbitrary units. In FIG. 6B the vertical axis indicates average end-to-end delay in seconds. In FIG. 6C the vertical axis indicates signaling overhead in MB.

Longer pause times result in fewer topology changes. Pause times vary from 20 seconds (high mobility) to 200 seconds (low mobility), and the speed of individual nodes is chosen randomly between 0 and 20 m/s. The other parameters remain the same. The packet-delivery ratios of ODVR and ODVR-od are higher than the delivery ratios for AODV and OLSR. ODVR and ODVR-od also attain shorter delays compared to OLSR and AODV, which means that ODVR converges faster and forwards packets faster than the other two protocols. As it was the case in the variable-speed scenario, ODVR and ODVR-od, introduce less overhead compared to AODV and OLSR. This is because ODVR uses smaller messages and fewer nodes to transmit signaling messages. The extra overhead on ODVR compared to ODVR-od is due to the routing state maintained for all popular destinations by every node.

4.3 Effect of Number of Flows

Figure 7A:
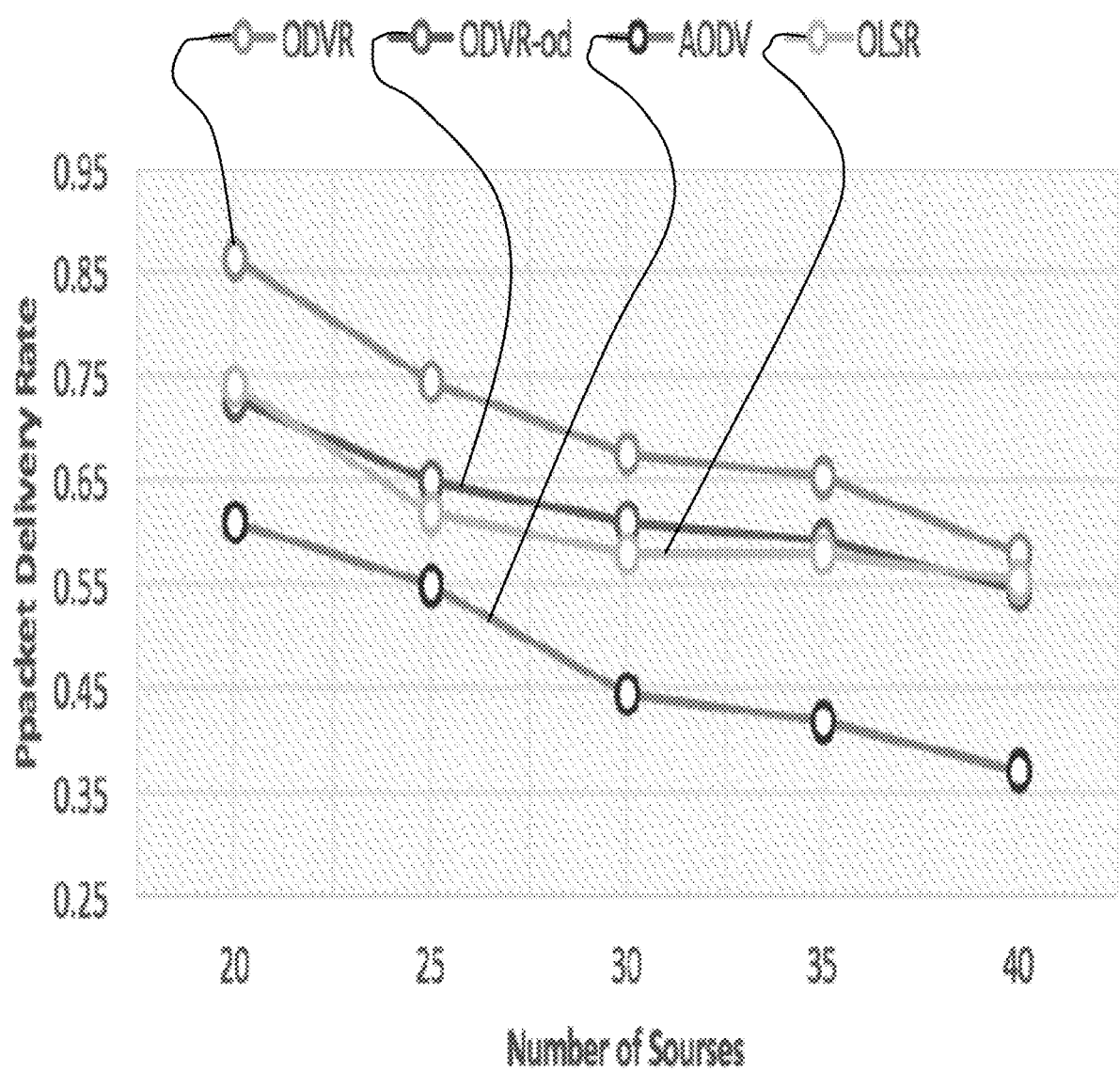
FIG. 7A through FIG. 7C are graphs that illustrate example favorable performance of an example embodiment compared to prior approaches as a function of number of sources using three different performance measures, respectively; according to an example embodiment.
Figure 7B:
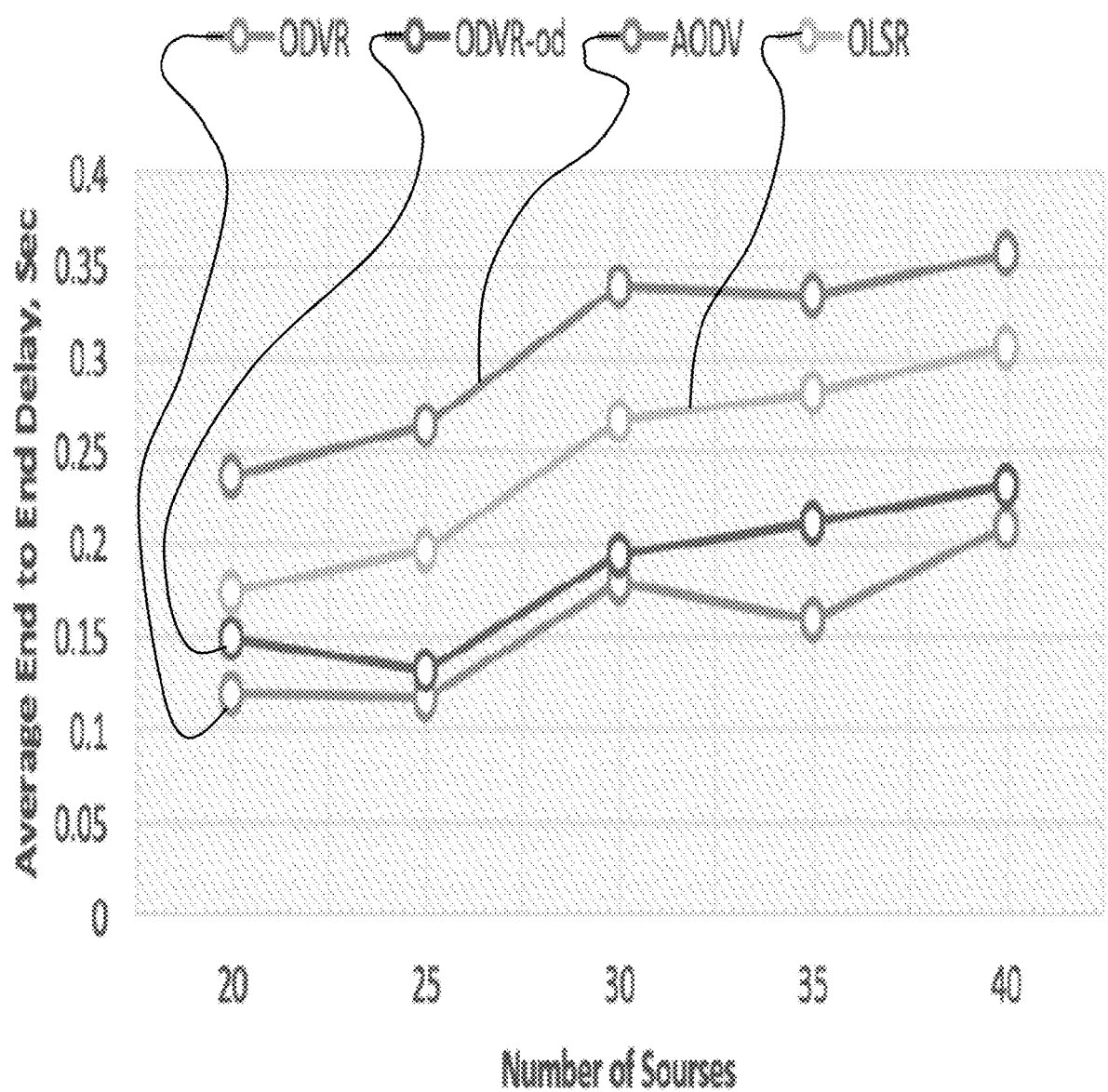
Figure 7C:
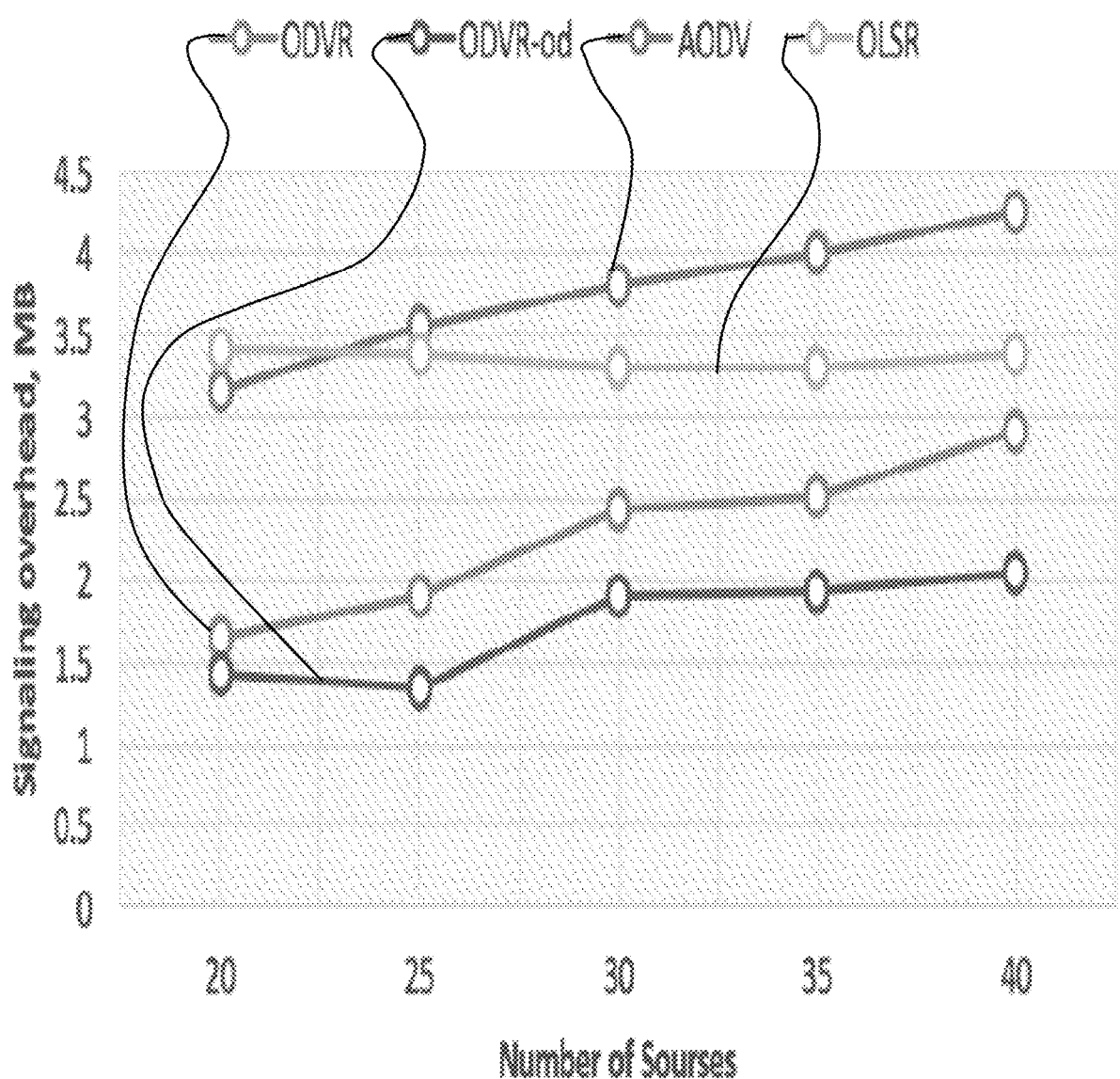

FIG. 7A through FIG. 7C are graphs that illustrate example favorable performance of an example embodiment compared to prior approaches as a function of number of sources using three different performance measures, respectively; according to an example embodiment. The horizontal axes indicate number of flows (represented by number of sources). In FIG. 7A the vertical axis indicates packet delivery rate in arbitrary units. In FIG. 7B the vertical axis indicates average end-to-end delay in seconds. In FIG. 7C the vertical axis indicates signaling overhead in MB.

Sources and destinations are selected randomly and the number of source-destination dataflow pairs (called a "flow" herein) varies between 20 to 40. The delivery rate decreases and the average end-to-end delays increase for all the protocols as the number of flows increases. This is expected, because more traffic causes more congestion in the network, and a link failure affects more packet transmissions when the number of flows increases. ODVR outperforms AODV and OLSR in both cases. The packet-delivery ratio of ODVR-od is close to the packet-delivery ratio in OLSR, but ODVR-od attains lower delays than OLSR.

Thus, The simulation results show that the integrated routing approach introduced in ODVR results in much better performance than traditional on-demand and proactive routing.

5. ROUTING HARDWARE OVERVIEW

Figure 4:
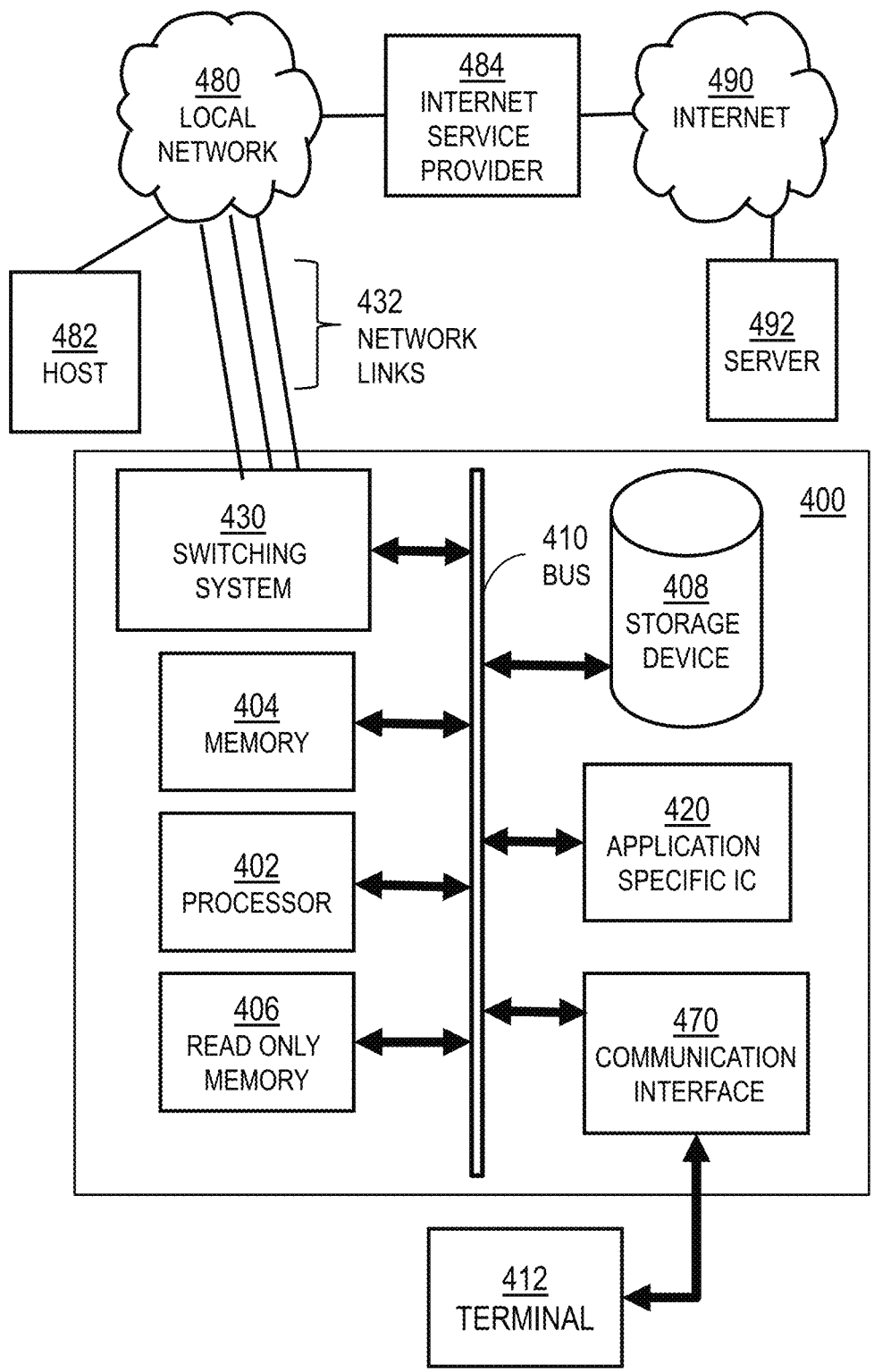
FIG. 4 is a block diagram that illustrates a networking computer system upon which an embodiment of the invention may be implemented.

FIG. 4 is a block diagram that illustrates a computer system 400 upon which an embodiment of the invention may be implemented. Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 400, or a portion thereof, constitutes a means for performing one or more steps of one or more methods described herein.

A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitutes computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk, optical disk, or FLASH-EPROM, for storing information, including instructions, that persists even when the computer system 400 is turned off or otherwise loses power.

Information, including instructions, is provided to the bus 410 for use by the processor from an external input device 412, such as a keyboard containing alphanumeric keys operated by a human user, or a sensor. A sensor detects conditions in its vicinity and transforms those detections into signals compatible with the signals used to represent information in computer system 400. Other external devices coupled to bus 410, used primarily for interacting with humans, include a display device 414, such as a cathode ray tube (CRT) or a liquid crystal display (LCD), for presenting images, and a pointing device 416, such as a mouse or a trackball or cursor direction keys, for controlling a position of a small cursor image presented on the display 414 and issuing commands associated with graphical elements presented on the display 414.

In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display 414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 400 includes switching system 430 as special purpose hardware for switching information flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

Computer system 400 also includes one or more instances of a communications interface 470 coupled to bus 410. Communication interface 470 provides a two-way communication coupling to a variety of external devices that operate with their own processors, such as printers, scanners and external disks. In general the coupling is with a network link 432 that is connected to a local network 480 to which a variety of external devices with their own processors are connected. For example, communication interface 470 may be a parallel port or a serial port or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. As another example, communications interface 470 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 470 sends and receives electrical, acoustic or electromagnetic signals, including infrared and optical signals, that carry information streams, such as digital data.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 402, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 402, except for carrier waves and other signals.

Logic encoded in one or more tangible media includes one or both of processor instructions on a computer-readable storage media and special purpose hardware, such as ASIC 420.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420, may be used in place of or in combination with software to implement the invention. Thus, embodiments of the invention are not limited to any specific combination of hardware and software.

The signals transmitted over network link 432 and other networks through communications interface 470, carry information to and from computer system 400. Computer system 400 can send and receive information, including program code, through the networks 480, 490 among others, through network link 432 and communications interface 470. In an example using the Internet 490, a server 492 transmits program code for a particular application, requested by a message sent from computer 400, through Internet 490, ISP equipment 484, local network 480 and communications interface 470. The received code may be executed by processor 402 as it is received, or may be stored in storage device 408 or other non-volatile storage for later execution, or both. In this manner, computer system 400 may obtain application program code in the form of a signal on a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to a signal on an infra-red a carrier wave serving as the network link 432. An infrared detector serving as communications interface 470 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402.

6. ALTERATIONS, DEVIATIONS AND MODIFICATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

7. REFERENCES

Each of the references cited is hereby incorporated by reference as if fully set forth herein, except for terminology inconsistent with that used herein.

[1] M. Abolhasan et al., "A Review of Routing Protocols for Mobile Ad Hoc Networks," Ad Hoc Networks, June 2003.

[2] K. Bhargavan et al., "Formal Verification of Standards for Distance ector Routing Protocols," Journal of the ACM, July 2002.

[3] J. Behrens and J. J. Garcia-Luna-Aceves, "Hierarchical Routing Using Link Vectors," Proc. IEEE INFOCOM '98, 1998.

[4] A. Boukersche, Handbook of Algorithms for Wireless and Mobile Computing, Chapman and Hall, 2006.

[5] T. Clausen and P. Jacquet, "Optimized Link State Routing Protocol (OLSR)" RFC 3626, 2003.

[6] M. S. Corson and A. Ephremides, "A Distributed Routing Algorithm for Mobile Wireless Networks," Wireless Networks, January 1995.

[7] T. Clausen, "Comparative Study of Routing Protocols for Mobile Ad-hoc networks," Research Report RR-5135, INRIA, 2004.

[8] J. J. Garcia-Luna-Aceves and H. Rangarajan, "A New Framework for Loop-Free On-Demand Routing Using Destination Sequence Numbers," Proc. IEEE MASS '04, 2004.

[9] J. J. Garcia-Luna-Aceves and M. Spohn, "Source-Tree Routing in Wireless Networks," Proc. of IEEE ICNP '99, October 1999.

[10] J. J. Garcia-Luna-Aceves and S. Roy, "On-Demand Routing in Ad Hoc Networks Using Link Vectors," IEEE JSAC, March 2005.

[11] Z. Haas and M. Pearlman, "Providing Ad-hoc Connectivity with the Reconfigurable Wireless Networks," Proc. IEEE ICUPC '97, October 1997.

[12] M. Joa-Ng and I. Lu, "Peer-to-peer Zone-based Two-level Link State Routing for Mobile Ad Hoc Networks," IEEE JSAC, August 1999.

[13] D. B. Johnson and D. A. Maltz, "Dynamic Source Routing in Ad Hoc Wireless Networks," Mobile Computing, Chapter 5, Kluwer Academic Publishers, 1996.

[14] J. Jubin and J. Tornow, "The DARPA Packet Radio Network Protocols," Proc. of The IEEE, January 1987.

[15] R. E. Kahn, "The Organization of Computer Resources into a Packet Radio Network," IEEE Trans. Commun., January 1977.

[16] Y. Ko and N. Vaidya, "Location-Aided Routing (LAR) in Mobile Ad Hoc Networks," Wireless Networks, Vol. 6, No. 4, 2000.

[17] M. Marina and S. Das, "Ad Hoc On-Demand Multipath Distance vector Routing," Wireless Commun. Mob. Comput., 2006.

[18] J. Lee et al., "Hybrid Gateway Advertisement Scheme for Connecting Mobile Ad Hoc Networks to the Internet," Proc. IEEE VTC 2003, April 2003.

[19] B. Liang and Z. Haas, "Hybrid Routing in Ad Hoc Networks with a Dynamic Virtual Backbone," IEEE Trans. Wireless Comm., June 2006.

[20] S. Murthy and J. J. Garcia-Luna-Aceves, "An Efficient Routing Protocol for Wireless Networks." Mobile Networks and Applications, 1996.

[21] N. Navid, W. Shiyi, and C. Bonnet, "HARP: Hybrid Ad hoc Routing Protocol," Proc. Int'l Symp. on Telecommunications '01, 2001.

[22] C. E. Perkins and P. Bhagwat, "Routing over Multihop Wireless Network of Mobile Computers," Proc. ACM SIGCOMM '94, 1994.

[23] C. E. Perkins and E. M. Royer, "Ad-Hoc On-Demand Distance Vector Routing," Proc. IEEE WMCSA '99, 1999.

[24] J. Raju and J. J. Garcia-Luna-Aceves, "A New Approach to On-Demand Loop-Free Multipath Routing," Proc. IEEE ICCCN '99, October 1999.

[25] V. Ramasubramanian et al., "SHARP: A Hybrid Adaptive Routing Protocol for Mobile Ad Hoc Networks," Proc. ACM MobiHoc '03, June 2003.

[26] S. Roy and J. J. Garcia-Luna-Aceves, "Node-Centric Hybrid Routing for Ad Hoc Networks," Proc. 10th IEEE/ACM MASCOTS '02, 2002.

[27] R. Van Glabbeek et al., "Sequence Numbers Do Not Guarantee Loop Freedom-AODV Can Yield Routing Loops," Proc. ACM MSWiM '13, November 2013.

[28] J. Wu and H. Li, "On Calculating Connected Dominating Set for Efficient Routing in Ad Hoc Wireless Networks," Proc. ACM DIALM '99, 1999.

[29] X. Wu et al., "A Unified Analysis of Routing Protocols in MANETs," IEEE Trans. on Communications, March 2010.

[30] M. Zhou et al., "The Proof of AODV Loop Freedom," Proc. IEEE WCS '09, 2009.

What is claimed is:

1. A method implemented on a processor of a node in a communications network to build a current routing table, the method comprising:
   determining a state of a destination node in the current routing table stored at a first node in a communications network;
   determining a value for a reference cost to the destination node, which reference cost is based on a minimum distance to the destination in the current routing table at the first node;
   forming at the first node a first request message that includes a reference distance field holding data that indicates the reference cost, an originating node field that holds data that indicates the first node that initiates the first request message, a destination field that holds data that indicates the destination node, and a first accumulated distance field holding data that includes actual accumulated cost of a route between a sending node and the first node;
   sending the first request message to a different neighboring node in the communications network;
   storing in a pending request table a first record holding data that indicates contents of at least the reference distance field, the originating node field, and the destination field;
   receiving a first reply message in response to sending the first request message, wherein the reply message includes a second accumulated distance field holding data that includes actual accumulated cost of a route between a sending node and the destination node; and
   the first reply message includes a reply reference distance field holding data that indicates a reply reference distance that is smaller than or equal to the contents of the reference distance field stored in the pending request table;
   updating the current routing table further comprises updating in the current routing table a value in a lowest cost field to equal a sum of a value in the reply accumulated distance field plus a cost of a link to the sending node;
   in response to receiving the first reply message, removing the first record in the pending request table; and
   updating the current routing table based on the reply message.

2. The method as recited in claim 1, further comprising:
   receiving a different second request message from a neighboring third node in the communications network, wherein the third node is different from the first node and the second request message includes a sender distance field that holds data that indicates a cost to the third node from a fourth node indicated in the originating node field of the second request message; and
   when data in the destination field of the second request message indicates the first node, then: determining a destination cost by adding the cost to the third node from the fourth node to a cost from the third node to the first node;
   forming a different second reply message that includes a destination distance field holding data that indicates the destination cost; and sending the second reply message to the third node.

3. The method as recited in claim 2, further comprising, when data in the destination field of the second request message indicates a second destination different from the first node and data in the reference distance field of the second request message indicates a cost greater than a cost in the current routing table to the second destination, then:

determining a destination cost by adding the cost to the third node from the fourth node and the cost from the third node to the first node and the cost in the current routing table to the second destination; forming the second reply message that includes the destination distance field holding data that indicates the destination cost using one or more fields in the second reply message; and sending the second reply message to the third node.

4. The method as recited in claim 2, further comprising, when data in the reference distance field of the second request message indicates a non-zero cost less than a cost in the current routing table to a second destination indicated by data in the destination field of the second request message, then forwarding the second request message; and storing in the pending request table a second record holding data that indicates at least the reference distance field in the second request message.

5. The method as recited in claim 1, further comprising becoming a proactive destination, comprising:

forming a different second reply message that includes a reference distance field holding data that indicates a null value; sending the second reply message at intermittent times to every neighboring node in the communications network.

6. A non-transitory computer-readable medium carrying one or more sequences of instructions, wherein execution of the one or more sequences of instructions by one or more processors causes the one or more processors to:

determine a state of a destination node in a current routing table stored at a first node in a communications network;

determine a value for a reference cost to the destination node, which reference cost is based on a minimum distance to the destination in the current routing table at the first node;

form at the first node a first request message that includes a reference distance field holding data that indicates the reference cost, an originating node field that holds data that indicates the first node that initiates the first request message, a destination field that holds data that indicates the destination node, and an accumulated distance field holding a single value that includes actual accumulated cost of a route between a sending node and either the destination node or the first node or both;

send the first request message to a different neighboring node in the communications network;

store in a pending request table, a first record holding data that indicates contents of at least the reference distance field, the originating node field, and the destination field;

receive a first reply message in response to sending the first request message, wherein the reply message includes a second accumulated distance field holding data that includes actual accumulated cost of a route between a sending node and the destination node; and the first reply message includes a reply reference distance field holding data that indicates a reply reference distance that is smaller than or equal to the contents of the reference distance field stored in the pending request table;

to update the current routing table further comprises to update in the current routing table a value in a lowest cost field to equal a sum of a value in the reply accumulated distance field plus a cost of a link to the sending node;

in response to receiving the first reply message, remove the first record in the pending request table; and update the current routing table based on the reply message.

7. The non-transitory computer-readable medium as recited in claim 6, wherein the one or more sequences of instructions further causes the one or more processors to:

receive a different second request message from a neighboring third node in the communications network, wherein the third node is different from the first node and the second request message includes a sender distance field that holds data that indicates a cost to the third node from a fourth node indicated in the originating node field of the second request message; and when data in the destination field of the second request message indicates the first node, then: determine a destination cost by adding the cost to the third node from the fourth node to a cost from the third node to the first node;

form a different second reply message that includes a destination distance field holding data that indicates the destination cost; and send the second reply message to the third node.

8. The non-transitory computer-readable medium as recited in claim 7, wherein the one or more sequences of instructions further causes the one or more processors, when data in the destination field of the second request message indicates a second destination different from the first node and data in the reference distance field of the second request message indicates a cost greater than a cost in the current routing table to the second destination, then:

determine a destination cost by adding the cost to the third node from the fourth node and the cost from the third node to the first node and the cost in the current routing table to the second destination; form the second reply message that includes the destination distance field holding data that indicates the destination cost using one or more fields in the second reply message; and send the second reply message to the third node.

9. The non-transitory computer-readable medium as recited in claim 7, wherein the one or more sequences of instructions further causes the one or more processors, when data in the reference distance field of the second request message indicates a non-zero cost less than a cost in the current routing table to a second destination indicated by data in the destination field of the second request message, then forward the second request message; and store in the pending request table a second record holding data that indicates at least the reference distance field in the second request message.

10. The non-transitory computer-readable medium as recited in claim 6 further comprising configuring a proactive destination wherein the one or more sequences of instructions further causes the one or more processors to:

form a different second reply message that includes a reference distance field holding data that indicates a null value; send the second reply message at intermittent times to every neighboring node in the communications network.

11. An apparatus comprising:
at least one processor;
a communications switching system; and
at least one memory including one or more sequences of instructions, the at least one memory and the one or more sequences of instructions configured to, with the at least one processor, cause the apparatus to:

determine a state of a destination node in a current routing table stored at a first node in a communications network;

determine a value for a reference cost to the destination node, which reference cost is based on a minimum distance to the destination in the current routing table at the first node;

form at the first node a first request message that includes a reference distance field holding data that indicates the reference cost, an originating node field that holds data that indicates the first node that initiates the first request message, a destination field that holds data that indicates the destination node, and an accumulated distance field holding data that includes actual accumulated cost of a route between a sending node and either the destination node or the first node or both;

send the first request message to a different neighboring node in the communications network;

store in a pending request table a first record holding data that indicates contents of at least the reference distance field, the originating node field, and the destination field;

receive a first reply message in response to sending the first request message, wherein the reply message includes a second accumulated distance field holding data that includes actual accumulated cost of a route between a sending node and the destination node; and the first reply message includes a reply reference distance field holding data that indicates a reply reference distance that is smaller than or equal to the contents of the reference distance field stored in the pending request table;

to update the current routing table further comprises to update in the current routing table a value in a lowest cost field to equal a sum of a value in the reply accumulated distance field plus a cost of a link to the sending node;

in response to receiving the first reply message, remove the first record in the pending request table; and update the current routing table based on the reply message.

12. The apparatus as recited in claim 11, wherein the one or more sequences of instructions further causes the processor to:

receive a different second request message from a neighboring third node in the communications network, wherein the third node is different from the first node and the second request message includes a sender distance field that holds data that indicates a cost to the third node from a fourth node indicated in the originating node field of the second request message; and when data in the destination field of the second request message indicates the first node, then: determine a destination cost by adding the cost to the third node from the fourth node to a cost from the third node to the first node;

form a different second reply message that includes a destination distance field holding data that indicates the destination cost; and send the second reply message to the third node.

13. The apparatus as recited in claim 12, wherein the one or more sequences of instructions further causes the processor, when data in the destination field of the second request message indicates a second destination different from the first node and data in the destination field of the second request message indicates a second destination different from the first node and data in the reference distance field of the second request message indicates a cost greater than a cost in the current routing table to the second destination, then:

determine a destination cost by adding the cost to the third node from the fourth node and the cost from the third node to the first node to the cost in the current routing table to the second destination;

form the second reply message that includes the destination distance field holding data that indicates the destination cost using one or more fields in the second reply message; and send the second reply message to the third node.

14. The apparatus as recited in claim 12, wherein the one or more sequences of instructions further causes the processor, when data in the reference distance field of the second request message indicates a non-zero cost less than a cost in the current routing table to a second destination indicated by data in the destination field of the second request message, then forward the second request message; and store in the pending request table a second record holding data that indicates at least the reference distance field in the second request message.

15. The apparatus as recited in claim 11 further comprising configuring a proactive destination wherein the one or more sequences of instructions further causes the processor to:

form a different second reply message that includes a reference distance field holding data that indicates a null value; send the second reply message at intermittent times to every neighboring node in the communications network.

* * * * *